United States Patent
Fujine et al.

(10) Patent No.: US 8,269,802 B2
(45) Date of Patent: Sep. 18, 2012

(54) IMAGE DISPLAY APPARATUS

(75) Inventors: Toshiyuki Fujine, Osaka (JP);
Michiyuki Sugino, Osaka (JP); Takashi Kanda, Osaka (JP); Eishi Oda, Osaka (JP); Masahiro Okui, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 295 days.

(21) Appl. No.: 12/667,024

(22) PCT Filed: Mar. 11, 2008

(86) PCT No.: PCT/JP2008/054416
§ 371 (c)(1),
(2), (4) Date: Feb. 19, 2010

(87) PCT Pub. No.: WO2009/004837
PCT Pub. Date: Jan. 8, 2009

(65) Prior Publication Data
US 2010/0182350 A1    Jul. 22, 2010

(30) Foreign Application Priority Data

Jun. 29, 2007  (JP) ................ 2007-172272
Jan. 21, 2008  (JP) ................ 2008-010994

(51) Int. Cl.
*G09G 5/00*    (2006.01)

(52) U.S. Cl. .............. 345/690; 345/102; 348/687

(58) Field of Classification Search .......... 345/690, 345/204, 211–213, 102, 76, 82, 87, 89; 348/687; 715/764, 810
See application file for complete search history.

(56) References Cited

U.S. PATENT DOCUMENTS

| | | | |
|---|---|---|---|
| 5,790,096 A * | 8/1998 | Hill, Jr. ............ | 345/600 |
| 6,870,529 B1 * | 3/2005 | Davis .............. | 345/207 |
| 7,643,095 B2 * | 1/2010 | Yoshii ............. | 348/687 |

(Continued)

FOREIGN PATENT DOCUMENTS

WO    WO 2005/029459 A1    3/2005

(Continued)

OTHER PUBLICATIONS

Russian Office Action with English translation.

*Primary Examiner* — Stephen Sherman
(74) *Attorney, Agent, or Firm* — Birch, Stewart, Kolasch & Birch, LLP

(57) ABSTRACT

In general, when a user views an image displayed on a display apparatus, visual environments, such as ambient brightness, a distance from the user to the display apparatus and so on, may disadvantageously cause the image displayed on the display apparatus to become difficult to view. Moreover, it is complicated and troublesome for the user to enter information of ambient light amount and others when setting a picture quality. An image display apparatus holds both question constituent information related to visual environments and choice information serving as answers to questions constituted by the question constituent information, and further holds a plurality of picture quality control rules suitable for visual environments assumed in accordance with the choice information serving as the answers. When sensing a power-up, the image display apparatus outputs the questions; acquires result information that is choices serving as answers from the user to those questions and that is used to acquire the picture quality control rules; and controls the picture quality in accordance with the picture quality control rules acquired in accordance with the result information.

14 Claims, 26 Drawing Sheets

U.S. PATENT DOCUMENTS

| | | | |
|---|---|---|---|
| 8,089,449 B2 * | 1/2012 | Kohashikawa et al. | 345/102 |
| 2001/0013854 A1 * | 8/2001 | Ogoro | 345/102 |
| 2001/0020928 A1 * | 9/2001 | Yanagisawa et al. | 345/98 |
| 2004/0183765 A1 * | 9/2004 | Morisawa | 345/89 |
| 2005/0179821 A1 * | 8/2005 | Suga et al. | 348/687 |
| 2005/0264702 A1 | 12/2005 | Yoshii | |
| 2006/0274023 A1 | 12/2006 | Sultenfuss et al. | |

FOREIGN PATENT DOCUMENTS

WO    WO-2006/129627 A1    12/2006

* cited by examiner

Fig. 3

| Inquiry ID | Information for forming inquiry | Option ID | Option information |
|---|---|---|---|
| Q1 | Selection of usage | A1 | Living room |
| | | A2 | On the desk (or Office) |
| | | A3 | Shop or business use |
| | | A4 | Bedroom |

Fig. 4

| Option ID | Luminance (cd/m$^2$) | Luminance modulation characteristics | Image quality setting | Brightness sensor |
|---|---|---|---|---|
| A1 | 283 | 283 as criterion | Middle level | OFF |
| A2 | 240 | 240 as criterion | Low level | OFF |
| A3 | Maximum | Fixed | High level | OFF |
| A4 | 283 | 283 as criterion | Middle level | ON |

Fig. 5
(a)
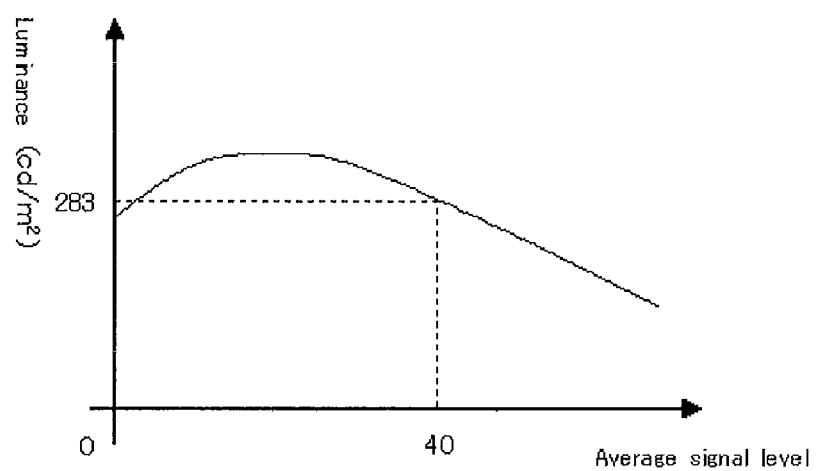
(b)
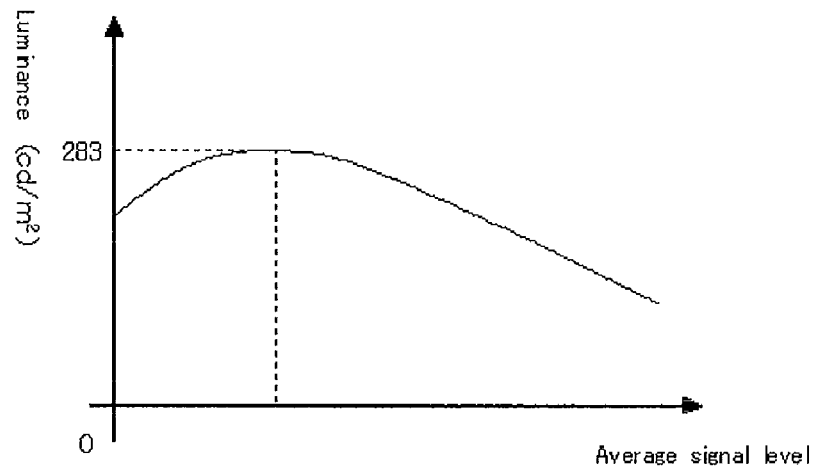

Fig. 12

| Option ID | Display size | Luminance (cd/m$^2$) | Luminance modulation characteristics | Image quality setting | Brightness sensor |
|---|---|---|---|---|---|
| A1 | 16 | 300 | 300 as criterion | High level | OFF |
|  | 26 | 289 | 289 as criterion |  |  |
|  | 32 | 283 | 283 as criterion | Middle level |  |
|  | 37 | 278 | 278 as criterion |  |  |
|  | 42 | 273 | 273 as criterion |  |  |
|  | 46 | 268 | 268 as criterion |  |  |
|  | 52 | 262 | 262 as criterion | Low level |  |
|  | 65 | 249 | 249 as criterion |  |  |
| A2 | All sizes | 240 | 240 as criterion | Low level | OFF |
| A3 | 16 | Maximum | Fixed | Highest level | OFF |
|  | 26 |  |  |  |  |
|  | 32 |  |  | High level |  |
|  | 37 |  |  |  |  |
|  | 42 |  |  |  |  |
|  | 46 |  |  |  |  |
|  | 52 |  |  | Middle level |  |
|  | 65 |  |  |  |  |
| A4 | 16 | 300 | 300 as criterion | High level | ON |
|  | 26 | 289 | 289 as criterion |  |  |
|  | 32 | 283 | 283 as criterion | Middle level |  |
|  | 37 | 278 | 278 as criterion |  |  |
|  | 42 | 273 | 273 as criterion |  |  |
|  | 46 | 268 | 268 as criterion |  |  |
|  | 52 | 262 | 262 as criterion | Low level |  |
|  | 65 | 249 | 249 as criterion |  |  |

Fig. 14
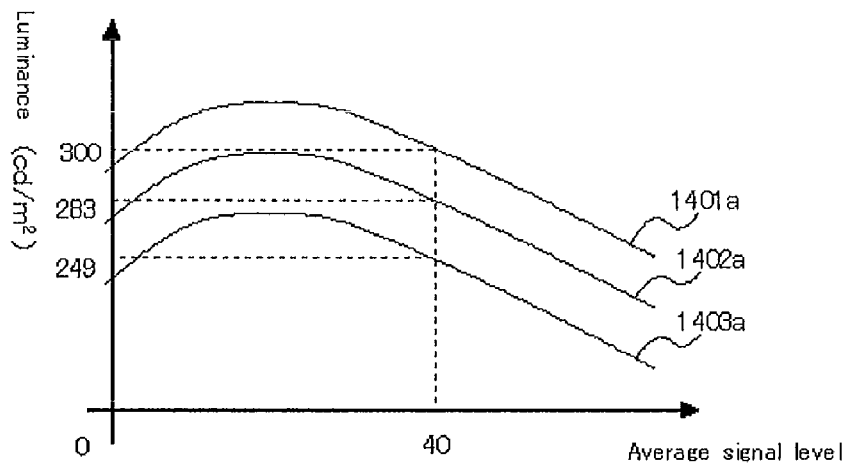
(a)
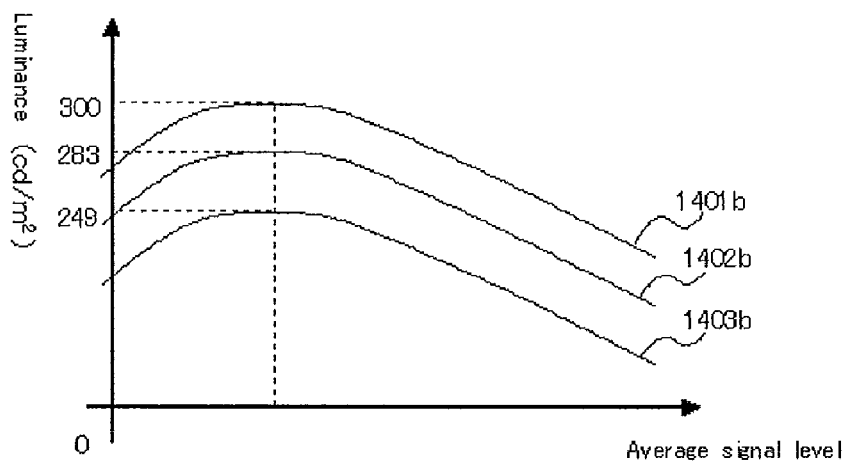
(b)

Fig. 15

| Display size | 16 | 26 | 32 | ... | | 65 |
|---|---|---|---|---|---|---|
| Enhancing edge | High | | | | | Low |
| Enhancing saturation | High | | | | | Low |

| Inquiry ID | Information for forming inquiry | Option ID | Option information |
|---|---|---|---|
| Q1 | Install in shop | A1 | Brighter |
| | | A2 | Standard |
| Q2 | Install in home | A3 | Darker |

(b)

| Inquiry ID | Information for forming inquiry | Option ID | Option information |
|---|---|---|---|
| Q1 | Install in shop | A1 | Brighter |
| | | A2 | Standard |
| | | A3 | Darker |
| Q2 | Install in home | A4 | Living room |
| | | A5 | On the desk (or Office) |
| | | A6 | Bedroom |

Fig. 25

| Audio-visual environment mode | Image quality mode | Luminance (cd/m$^2$) | Icon |
|---|---|---|---|
| 1 | 1 | 450 | Brighter |
| | 2 | 350 | Darker |
| 2 | 1 | 300 | Brighter |
| | 2 | 240 | Darker |

IMAGE DISPLAY APPARATUS

FIELD OF THE INVENTION

The present invention relates to an image display apparatus controlling image quality of displayed images, in which the control is triggered by power-on, according to an audio-visual environment of a user and the only thing the user has to do for suitable image quality control is to answer simple inquiries.

BACKGROUND ART

Generally, when the user watches images displayed on the display apparatus, there is a deficiency that the image displayed on the display becomes less-visible depending on the audio-visual environment such as ambient brightness and distance between the user and the display apparatus. In order to solve the above deficiency, for example, the patent reference 1 discloses a display apparatus, in which control of image quality is carried out by inputting weather, light intensity, and viewing position etc.

Patent reference 1: Unexamined Japanese Patent Publication No. 2007-43533

DISCLOSURE OF THE INVENTION

Problems that the Invention Tries to Solve

Generally, adjustment of image quality of the display is carried out while viewing the display. For example, when the ambient brightness is high while viewing the display, the luminance or contrast of the display is appropriately enhanced, or when a child views the display, in order to reduce stimulus, the luminance or contrast of the display is appropriately reduced. However, for the elderly or a user who is not familiar with appliances, in many cases, they cannot easily adjust image quality. Therefore, even if the luminance or contrast of the display is too high or too low, many of such users give up on the adjustment.

In addition, generally, the image quality of display is adjusted, therefore, its brightness and contrast is enhanced before shipment from a factory, so that it looks better at the shop. In this case, although the image quality is suitable for viewing at the shop, when viewing in a home, its brightness and contrast may be too high. Then, the user does the adjustment of the image quality in order to reduce the luminance or contrast etc. However, the user who is not familiar with appliances cannot do the adjustment of image quality and cannot help but to view the display with unnecessarily high brightness. Here, a system for easily and semi-automatically selecting the image quality is demanded by the user.

In addition, in the display apparatus of the patent reference 1, setting of image quality is carried out by directly inputting weather (light intensity), current time, and viewing position etc. Additionally, for example, weather-related information is automatically acquired from an FM multiple signal transmitted from VICS (Vehicle Information and Communication System), however, if the power of an audio apparatus is off, it is impossible to receive the information. Additionally, it is disclosed that the user inputs such information, however, it is too complicated and bothersome for the user to input them when they deem it appropriate.

Means for Solving the Problems

In an aspect of the present invention, an image display apparatus stores information for forming inquiry relating to an audio-visual environment and option information selected as an answer in response to the inquiry formed on the basis of the information for forming inquiry, and stores a plurality of image quality control rules suitable for the audio-visual environment expected according to the option information as the answer. In addition, the image display apparatus outputs the inquiry on the basis of the information for forming inquiry stored in the storage for inquiry, in which the output is triggered by detection of the power-on, and acquires result information, which is an option as the answer from a user and is to be utilized for acquiring the image quality control rule, acquires the image quality control rule from the storage for image quality control rules according to the result information, and the image quality control is carried out according to the acquired image quality control rule.

FIG. 1 is a conceptual diagram showing operations of an image display apparatus of the present invention. When the power-on of the image display apparatus is done (0101), the inquiries relating to the audio-visual environment are outputted (0102) to the user. These inquiries relating to the audio-visual environment are simple inquires (0103), for example, inquiries about usages of the image display apparatus. Additionally, options for the inquires are preliminarily provided, and the image quality control rules suitable for the audio-visual environment expected corresponding to the respective options (0104, 0105, 0106, and 0107) are preliminarily determined. Therefore, when the user of the image display apparatus answers to the simple inquiries related to the audio-visual environment, the predetermined image quality control rule is determined according to the answer, thereby carrying out the image quality control in accordance with the determined image quality control rule. Accordingly, the only thing the user has to do for suitable image quality control is to answer the simple inquiries upon the power-on of the image display apparatus.

In another aspect of the present invention, a processing to acquire the image may be executed only when the power-on is done upon installation of the apparatus. In another aspect of the present invention, display size information as the result information may be acquired. In another aspect of the present invention, the image quality control rule may be changed. In another aspect of the present invention, the image quality control may be changed. In another aspect of the present invention, the image quality control may include any one or more than one of luminance control, luminance modulation characteristics control, color density control, or sharpness control. In another aspect of the present invention, a result of the acquisition of the image quality control rule may be displayed.

Effects of the Invention

In the image display apparatus of the present invention, simple inquires relating to the audio-visual environment are outputted when the power-on is detected, and the only thing the user has to do for suitable image quality control is to answer the simple inquiries, thereby improving user-friendliness.

DETAILED DESCRIPTION OF THE INVENTION

Embodiments of the present invention will be described hereinbelow with reference to the drawings. The present invention is not to be limited to the above embodiments and able to be embodied in various forms without departing from the scope thereof. A first embodiment will mainly describe Claims 1, 6, 8, and 10 to 12. A second embodiment will mainly describe Claims 2 and 13. A third embodiment will mainly describe Claim 3, A fourth embodiment will mainly describe Claim 4. A fifth embodiment will mainly describe Claim 5. A sixth embodiment will mainly describe Claim 7. A seventh embodiment will mainly describe Claim 9.

<<First Embodiment>>

<Concept of First Embodiment>

In a first embodiment, an image display apparatus stores information for forming inquiry relating to an audio-visual environment and option information selected as an answer in response to the inquiry formed on the basis of the information for forming inquiry, and stores a plurality of image quality control rules suitable for the audio-visual environment expected according to the option information as the answer. In addition, the image display apparatus outputs the inquiry on the basis of the information for forming inquiry stored in the storage for inquiry, in which the output is triggered by detection of the power-on, and acquires result information, which is an option as the answer from a user and is to be utilized for acquiring the image quality control rule, acquires the image quality control rule from the storage for image quality control rules according to the result information, and the image quality control is carried out according to the acquired image quality control rule.

<Configuration of First Embodiment>

FIG. 2 is a functional block diagram of the image display apparatus of the first embodiment.

An image display apparatus (0200) comprises a 'storage for inquiry' (0201), a 'storage for image quality control rules' (0202), a 'first acquirer' (0203), an 'acquirer for image quality control rule' (0204), an 'image quality controller' (0205), a 'power-on detector' (0206), and a 'setting controller' (0207).

Note that the respective units of the present invention can be configured by hardware, software, or both hardware and software. For example, in the case of using a computer, the respective units are implemented by the hardware configured by a CPU, a memory, a bus, an interface, and other peripheral devices etc., and by the software operable on the hardware. Concretely speaking, by sequentially carrying out programs on the memory, the data on the memory and the data inputted via the interface are processed, stored, and outputted etc., thereby implementing functions of the respective units. (Hereinafter, the same applies throughout the entire specification).

The 'storage for inquiry' (0201) stores information for forming inquiry relating to an audio-visual environment and option information selected as an answer in response to the inquiry formed on the basis of the information for forming inquiry. The terms '(information for forming inquiry) relating to an audio-visual environment' corresponds to inquiry relating to environment, in which the image display apparatus is used, and mainly corresponds to inquiry relating to usage. Examples of answers (options) include, as shown in FIG. 1, usage in living room, usage on the desk, usage in the shop or business use, and usage in the bedroom. The 'information for forming inquiry' is information for forming the inquiry, and may be an inquiry sentence itself, or may be information indicating an outline or a type etc. of the inquiry. FIG. 3 is a diagram exemplifying information for forming inquiry and option information, which are stored in the storage for inquiry. The information for forming inquiry of FIG. 3 indicates the outline of the inquiry, and its content is 'Selection of usage'. Additionally, in the storage for inquiry, the information for forming inquiry and the option information are correlated and stored, and in FIG. 3, option information corresponding to the four answers as shown in FIG. 1 are stored. Thus, the 'option information' may be the option itself, or may be information indicating an outline or a type etc. of the option. Additionally, FIG. 3 shows single information for forming inquiry, and there may be a plurality of information for forming inquiry. Moreover, in FIG. 3, 'Inquiry ID' and 'Option ID' are identifiers for uniquely identifying the information for forming inquiry and the option information, respectively. The storage for information for forming inquiry stores the information as shown in FIG. 3 in a storage area such as a hard-disk and a semi-conductor memory.

Moreover, the information for forming inquiry may include at least two pieces of information, therefore, information of inquiry for acquiring an image quality control rule for relatively high-level illumination such as the audio-visual environment in the shop, and information of inquiry for acquiring an image control rule for relatively low-level illumination such as the audio-visual environment in the home. FIG. 21 shows an example of the information. In FIG. 21, the information for forming inquiry corresponds to information relating to an installation place, therefore, two pieces of information of 'Installation in shop' and 'Installation in home'. The option information may be given to each information for forming inquiry in common as in case (a), or may be given with respect to each information for forming inquiry in case (b). Note that in the case of audio-visual environment in the home, the user may be elderly or a user who is not familiar with appliances and it is preferable that the option information is concretely provided as in case (b), so that the option information is more understandable for such user. Moreover, the information relating to the installation place may include a home theater with no illumination etc. other than the shop and the home.

The 'storage for image quality control rules' (0202) stores a plurality of image quality control rules suitable for the audio-visual environment expected according to the option information of the answer. The 'image quality control rules' is information indicating details of the control upon image quality control by the after-mentioned image quality controller (0205). Concretely speaking, for example, the details of the control include controls of luminance, luminance modulation characteristics and image quality (edge enhancement and saturation enhancement). The terms '(image quality control rules suitable for) audio-visual environment expected according to the option information' will be described hereinafter. Here, take the option of FIG. 3 for example, assuming a normal living room in Japan for the option 'Living room', it is known from statistics that vertical illumination of a display screen is approximately 200 lx, and viewing distance (distance between the image display apparatus and the user) is approximately. 2.5 m. Therefore, in the audio-visual environment expected according to the option 'Living room', 'the vertical illumination of a display screen is approximately. 200 lx and the viewing distance is approximately. 2.5 m'. Additionally, FIG. 4 is a diagram exemplifying image quality control rules stored in the storage for image quality control rules, and information, which indicates that luminance: 283 cd/m$^2$, luminance modulation characteristics: 283 (cd/m$^2$) as criterion, image quality setting: middle, and brightness sensor: OFF, is stored. These correspond to the 'image quality control rules suitable for audio-visual environment'.

Here, a description of setting method of the image quality control rule is provided. The case of the option 'Living room (Option ID: A1)' is described. According to a general experimental result, a relation between a display size S (inches) at the vertical illumination 180 lx and at the viewing distance 2.5 m and the most suitable maximum display luminance Y is expressed by $Y=-1.0396 \times S+316.77$ (Formula 1). FIG. 13(*a*) is a diagram showing the experimental result. In addition, FIG. 13(b) shows the maximum luminance at the respective display sizes calculated by Formula 1. Here, if the display size is 32 inches, the maximum luminance is approximately 283 cd/m², so that, in FIG. 4, the luminance of the option ID 'A1' is set to 283 cd/m². FIG. 5 is a diagram exemplifying graphs of luminance modulation characteristics. Here, according to statistics, an average signal level of TV broadcasting is approximately. 40%, so that the luminance modulation characteristics are set to '283 (cd/m²) as criterion'. This may mean that the luminance modulation characteristics is controlled, so that the luminance at the average signal level 40% is 283 cd/m² as shown in FIG. 5(a), or may mean that the control is carried out, so that the maximum luminance upon the luminance modulation is 283 cd/m² as shown in FIG. 5(b). In FIG. 4, the image quality is set to middle in the option ID 'A1', and specifically, this means that levels of the edge enhancement and the saturation enhancement are set to the middle level. Additionally, the storage for image quality control rules stores the information of FIG. 3 in the storage area such as a hard-disk or a semi-conductor memory.

The 'first acquirer' (0203) outputs the inquiry on the basis of the information for forming inquiry stored in the storage for inquiry, and acquiring result information, which is an option as the answer from a user and is to be utilized for acquiring the image quality control rule. When 'outputting the inquiry on the basis of the information for forming inquiry', there are two cases as described above, a case in which the information for forming inquiry is an inquiry sentence itself, and a case that the information for forming inquiry is information indicating an outline or a type etc. of the inquiry. When the information for forming inquiry is an inquiry sentence itself, the information for forming inquiry may be outputted as it is. Meanwhile, when the information for forming inquiry is information indicating an outline or a type etc. of the inquiry, the data of the inquiry sentence corresponding to the information for forming inquiry is stored in the other predetermined storage area, and it is assumed that the information for forming inquiry is outputted to the user. FIG. 6 is a diagram exemplifying inquiries when the inquiries are outputted on the basis of the information for forming inquiry. Note that, as the output method of the inquiry, as shown in FIG. 6, the inquiry may be displayed on the display screen, or may be audibly outputted by reading the inquiry and option. In addition, the term 'result information, which is an option as the answer from a user and is to be utilized for acquiring the image quality control rule' corresponds to the 'Option ID' in FIGS. 3 and 4. Therefore, the terms 'acquiring result information' corresponds, for example, to a case that the user selects one option by holding a button of a remote control down while watching a screen of FIG. 6, the option ID of the option selected according to a signal of the button. Additionally, when outputting the inquiry on the display screen, it is preferable that the entire display screen is dark as shown in FIG. 6. The reason for this is that when a person watches a bright screen initially, even if an image with sufficient brightness is displayed after that, they feel that it is dark.

Moreover, the 'first acquirer' (0203) may comprise 'means for displaying an option in a state of provisional selection'. The means for displaying an option in a state of provisional selection is a function of displaying, such that, in a screen for selecting the option to acquire the image quality control rule for the relatively high-luminance or the option to acquire the image quality control rule for the relatively low-luminance, the option for selecting the image quality control rule for the relatively low-luminance is provisionally selected in an initial status. It is preferable that a manufacture of the image display apparatus of the first embodiment sets the option for selecting the image quality control rule to be recommended for the end user to the option in a state of provisional selection. In the state of being provisional selection, the process for the user to 'select' one of two options is omitted, and the one option is 'selected' and 'determined' by a simple process to 'determine'. For example, an icon for displaying the option for acquiring the image quality control rule for relatively high-level illumination and an icon for displaying the option for acquiring the image quality control rule for relatively low-level illumination are displayed side-by-side, and the user 'selects' one of the options through the remote control, and presses the button to 'determine' the option, thereby executing the image quality control corresponding to the determined option. Here, when the user 'selects' one of the icons, the icon flashes. In this case, the state of icon flashing corresponds to the state of provisional selection. Therefore, the option icon for selecting the image quality control rule for relatively low-level illumination flashes in the initial state. When the user is elderly or is not familiar with appliances, he often operates the apparatus as instructed by the screen display without reading a manual and without thinking. Even in such case, it is possible to select the image quality control rule for relatively low-level illumination suitable for the home use. Moreover, when installing the apparatus in the shop, it is assumed that a person who is familiar with appliances operates it, and he can set the suitable state easily even if the initial state is not suitable for the shop. Therefore, inconveniences are not caused.

FIG. 22 is a functional block diagram of the image display apparatus of the first embodiment. An image display apparatus (2200) comprises a 'storage for inquiry' (0201), a 'storage for image quality control rules' (0202), a 'first acquirer' (0203), an 'acquirer for image quality control rule' (0204), an 'image quality controller' (0205), a 'power-on detector' (0206), and a 'setting controller' (0207). The 'first acquirer' (0203) may comprise the 'means for displaying an option in a state of provisional selection' (2201). Moreover, an image display apparatus (2000) may comprise the after-mentioned second acquirer, changer for image quality control rule, changer for image quality control, display for result, and switching interface.

The 'acquirer for image quality control rule' (0204) acquires the image quality control rule from the storage for image quality control rules according to the result information. The 'result information' corresponds to the result information acquired by the first acquirer (0203). Therefore, for example, when information indicating 'Option ID: A1' as the result information is acquired by the first acquirer, the image quality control rule in the case that the option ID is 'A1' is acquired with reference to the information of FIG. 4. Concretely speaking, for example, when the information of FIG. 4 is stored as a database in the storage area such as a hard-disk, SQL query to the database for extracting 'luminance', 'luminance modulation characteristics', and 'image quality setting' for the option ID 'A1' is executed, thereby acquiring the image quality control rule.

The 'image quality controller' (0205) controls the image quality according to the acquired image quality control rule. The terms 'acquired image quality control rule' corresponds to the image quality control rule acquired by the acquirer for image quality control rule (0204). The term 'controls the image quality' means control of the display settings. The term 'controls the image quality according to the acquired image quality control rule' means, for example, that when the image quality control rule for the option ID 'A1' is acquired by the acquirer for image quality control rule (0204), the image quality controller controls the luminance to '283 cd/m$^2$', the luminance modulation characteristic to '283 (cd/m$^2$) as criterion', and the image quality setting to 'middle level'.

Moreover, the image quality control may include any one or more than one of luminance control, luminance modulation characteristics control, color density control, or sharpness control. In this case, it is assumed that the image quality control rule as shown in FIG. 4 includes any one or more than one of luminance control, luminance modulation characteristics control, color density control, or sharpness control.

Additionally, the 'image quality controller' (0205) may include means for controlling image quality of inquiry screen. The 'means for controlling image quality of inquiry screen' is a function of controlling image quality of an inquiry screen utilizing the image quality control rule for relatively low-luminance among the image quality control rules stored in the storage for image quality control rules upon outputting the inquiry from the first acquirer. The reason for this is that after a person watches a bright screen, even if an image with sufficient brightness is displayed, they may feel that it is dark, and there is a possibility that the suitable image quality control is not carried out. Note that, the image quality control rule for relatively low-luminance means a rule other than the image quality control rule for highest luminance among the image quality control rules stored in the storage for image quality control rules. For example, when there is the image quality control rule for shop corresponding to the audio-visual environment with a relatively high level of illumination such as the audio-visual environment in the shop and the image quality control rule for home corresponding to the audio-visual environment with a relatively low level of illumination such as the audio-visual environment in the home, the image quality control rule for shop is utilized for the image quality control.

FIG. 23 is a functional block diagram of the image display apparatus of the first embodiment. An image display apparatus (2300) comprises a 'storage for inquiry' (0201), a 'storage for image quality control rules' (0202), a 'first acquirer' (0203), an 'acquirer for image quality control rule' (0204), an 'image quality controller' (0205), a 'power-on detector' (0206), and a 'setting controller' (0207). The 'image quality controller' (0205) may comprise the 'means for controlling image quality of inquiry screen' (2301). Moreover, an image display apparatus (2000) may comprise the after-mentioned second acquirer, changer for image quality control rule, changer for image quality control, display for result, and switching interface.

Note that, in the after-mentioned processes on the hardware, the image quality control of a screen for displaying inquiries is carried out by utilizing the image quality control rule for relatively low-luminance.

The 'power-on detector' (0206) detects a power-on. The 'power-on' is a power-on upon using the image display apparatus. This power-on may be a power-on of main power, or a power-on after power-off through a remote control etc. in a state that the main power remains on (i.e., standby status). For example, in a concrete processing in the power-on detector, it is determined by a reception of the power-on signal transmitted from the remote control to operate the image display apparatus in the standby status through an infrared reception module that the power is on; therefore, this is the detection of the power-on.

The 'setting controller' (0207) operates the acquirer for image quality control rule according to the detection. The 'detection' corresponds to the detection by the 'power-on detector' (0206). The term 'operates the acquirer for image quality control rule' means, concretely speaking, that the first acquirer (0203) is caused to execute the processing, and the 'acquirer for image quality control rule' (0204) is caused to execute the processing. In this case, for example, it is assumed that the setting controller outputs an instruction for execution to the first acquirer, and the first acquirer is ready to execute upon receiving the instruction for execution. The first acquirer executes the processing, in which the execution is triggered by the reception of the instruction for execution, and subsequently, the acquirer for image quality control rule executes processing.

<Processes on Hardware>

FIG. 7 is a diagram exemplifying processes on hardware of the image display apparatus of the first embodiment. At the outset, the information for forming inquiry (0701) and the option information (0702) as shown in FIG. 3 are stored in the storage such as the hard-disk or the semi-conductor memory. In addition, a plurality of image quality control rules (a group of image quality control rules) as shown in FIG. 4 are also stored in the storage. These data are developed on the main memory, in which the processing is triggered by the detection of the power-on signal (0707) by the infrared reception module. Note that, this power-on signal (0707) corresponds, for example, to the power-on signal from the remote control to operate the image display apparatus. Subsequently, the inquiry is outputted the display etc. on the basis of the information for forming inquiry, and according to this, the result information (0704) is acquired through the user interface such as the remote control by user's operation. The acquired result information is stored in the main memory. According to the group of image quality control rules and the result information, a suitable image quality control rule (0705) is selected and stored in the maim memory, thereby executing the image quality control of the display (0706). Moreover, the storage may store a program for determining the state of provisional selection.

Note that, the processing on the hardware described with reference to FIG. 7 is an example for explaining the outline of the processing. (The same applies throughout the entire specification.)

<Processing Flow of First Embodiment>

FIG. 8 is a flowchart of processes in the image display apparatus of the first embodiment. At the outset, it is determined whether the power is on (S0801). If the power is not on, the step S0801 is repeated. If it is determined that the power is on, the inquiry on the basis of the information for forming inquiry is outputted (S0802). Subsequently, the result information as the option for the answer to the inquiry is acquired (S0803). Subsequently, the image quality control rule is acquired according to the result information (S0804). Subsequently, the image quality control is executed according to the acquired image quality control rule (S0805).

Note that, it is possible to regard the flowchart of FIG. 8 as a flowchart of a program to be executed by a computer. Moreover, it is possible to store such a program in a medium such as a flexible disk. (The same applies thorough the entire specification.)

<Brief Description of Effects of First Embodiment>

In the image display apparatus of the first embodiment, simple inquires relating to the audio-visual environment are outputted when the power-on is detected, and the only thing the user has to do for suitable image quality control is to answer the simple inquiries, thereby improving user-friendliness.

<<Second Embodiment>>

<Concept of Second Embodiment>

The second embodiment of the present invention is the image display apparatus executes a function of acquiring the image quality control rules only when a power-on is done upon installation of the apparatus.

<Configuration of Second Embodiment>

A configuration of the image display apparatus of the second embodiment is the same as that in FIG. 2. Moreover, in the apparatus, the above-mentioned power-on detector (0206) works only when a power-on is done upon installation of the apparatus. The term 'when a power-on is done upon installation' means that an initial power-on when the image display apparatus is installed. Therefore, there are cases such as a case that the user does the initial power-on after he purchases the apparatus and places it, or a case that the user does the initial power-on after he moves the apparatus to a new installation place. It is assumed that when the initial power-on after the user purchases the apparatus, the image quality is set to be suitable for the shop, and it is assumed that when the installation place is changed, normally, the audio-visual environment also changes. Additionally, examples of a method for determining the initial power-on after the installation of the apparatus include a case that a flag is set on a flash memory in the image display apparatus upon shipment from a factory, and the flag indicates no power-on by the user, so that the initial power-on after the installation is determined, a case that the initial power-on after the installation is determined by passage of a long period since the last power-off, and a case that the initial power-on after the installation is determined by equipping a switch which is released upon moving the image display apparatus with the apparatus, thereby detecting the change of the installation place. As the concrete processing of the power-on detector, for example, when the power-on of the image display apparatus is done, it is detected that the flag indicates no power-on, thereby determining the initial power-on. After that, the flag is set so as to indicate the power-on. Moreover, as another method, when the power-on of the image display apparatus is done, the date and time of the last power-off and the current date and time are compared, and if a predetermined period of time passes, the initial power-on after the installation is determined Thus, the initial power-on after the installation is determined.

<Processes on Hardware>

The processes on hardware of the image display apparatus of the second embodiment are the same as those of FIG. 7. Moreover, the processes of FIG. 7 are executed only when a power-on is done upon installation of the apparatus <Processing Flow of Second Embodiment>

FIGS. 10(*a*) and 10(*b*) are flowcharts of processes in the image display apparatus of a second embodiment. At the outset, the flowchart of FIG. 10(*a*) is explained. It is determined whether the power-on has been done in the past (S1001). This is determined by the flag in the flash memory. If the power-on has been done (NO), the processing is terminated. If the power-on has not been done (YES), the power-on detector determines the power-on (S0801). If the power-on is not detected, the step S0801 is repeated. If it is determined the power is on, the inquiry on the basis of the information for forming inquiry is outputted (S0802). Subsequently, the result information as the option for the answer to the inquiry is acquired (S0803). Subsequently, the image quality control rule is acquired according to the result information (S0804). Subsequently, the image quality control is executed according to the acquired image quality control rule (S0805).

Subsequently, the flowchart of FIG. 10(*b*) is explained. At the outset, it is determined whether the power is on (S0801). If the power-on is not detected, the step S0801 is repeated. If it is determined the power is on, it is determined whether it is the initial power-on (S1001). If it is not the initial power-on after the installation, the processing returns to step S0801. If it is the initial power-on after the installation, the inquiry on the basis of the information for forming inquiry is outputted (S0802). Subsequently, the result information as the option for the answer to the inquiry is acquired (S0803). Subsequently, the image quality control rule is acquired according to the result information (S0804). Subsequently, the image quality control is executed according to the acquired image quality control rule (S0805).

Note that, in flowcharts of this specification, the same reference number is given to the same processing.

<Brief Description of Effects of Second Embodiment>

In the image display apparatus of the second embodiment, when the installation place is changed and the audio-visual environment changes, the image quality control suitable for the audio-visual environment after change is automatically carried out.

<<Third Embodiment>>

<Concept of Third Embodiment>

The third embodiment of the present invention is the image display apparatus acquiring display size information as the result information.

<Configuration of Third Embodiment>

FIG. 11 is a functional block diagram of the image display apparatus of the third embodiment. An image display apparatus (1100) comprises a 'storage for inquiry' (0201), a 'storage for image quality control rules' (0202), a 'first acquirer' (0203), an 'acquirer for image quality control rule' (0204), an 'image quality controller' (0205), a 'power-on detector' (0206), a 'setting controller' (0207), and a 'second acquirer' (1101). The configurations other than the 'second acquirer' (1101) are the same as those above-described, so that descriptions are omitted. Note that, in functional block diagrams of this specification, the same reference number is given to the same component.

The 'second acquirer' (1101) acquires display size information as the result information. The acquired display size information as the result information is used for acquiring the image quality control rule by the 'acquirer for image quality control rule' (0204). Normally, the image display apparatus recognizes its display size (stores it internally as the information), so that the term 'acquisition' of the display size information in the second acquirer corresponds to reading out the display size information from the internal storage. If such information is not stored internally, the information may be acquired from external apparatus or by user's input operation. Moreover, the above-mentioned first acquirer (0203) also acquires the option as the result information, and the first acquirer (0203) and the second acquirer (1101) may be configured by the same circuit or by different circuit.

FIG. 12 is a diagram exemplifying image quality control rules, which are stored in the storage for image quality control rules, and are used for image quality control on the basis of display size. For example, in the case of the option ID 'A1' (Living room), as described above, according to the experimental result of FIG. 13(*a*), it is known that the most suitable maximum luminance is determined by $Y = -1.0396 \times S + 316.77$ (Formula 1). FIG. 13(*b*) shows the maximum luminance at the respective display sizes calculated by the formula 1. Therefore, these values are indicated as the luminance values at the respective display sizes in the option ID 'A1' in FIG. 12 (numbers after the decimal point are truncated). As for the luminance modulation characteristics, FIG. 14 is a diagram exemplifying graphs of luminance modulation characteristics in each display size. FIG. 14 shows a graph of luminance modulation characteristics in a 16-inch display (1401*a* and 1401*b*), a graph of luminance modulation characteristics in a 32-inch display (1402*a* and 1402*b*), and a graph of luminance modulation characteristics in a 65-inch display (1403a and 1403b) as representative examples. Similar to FIG. 5, it is known that the average signal level of TV broadcasting is approximately. 40%. Therefore, the luminance modulation characteristics may be controlled, so that, as in FIG. 14(*a*), the luminance at the average signal level 40% is the maximum luminance at the respective display sizes, or may be controlled, so that, as in FIG. 14(*b*), the maximum luminance upon luminance modulation is the same value as the suitable maximum luminance. Additionally, FIG. 15 explains the 'image quality setting' of FIG. 12. Generally, it is known that, for human eyes, as image size is reduced, the image gets blurry and its saturation lowers. Accordingly, as the display size is reduced, the edge enhancement and the saturation enhancement are set to higher. Therefore, in the 'image quality setting' of FIG. 12, as the display size is reduced, the image quality setting is set to a higher level, and as the display size is increased, the image quality setting is set to lower level. Additionally, the audio-visual environment expected for the option ID 'A2' (on the desk) is 'the vertical illumination 180 lx and at the viewing distance 3H (3 times of height of the display)', and in this case, it is known from general experimental result that the suitable maximum luminance is '240 cd/m$^2$' which is common for all sizes. In addition, as the image quality setting, since the viewing distance is short, the setting value is set to lower for all display sizes (FIG. 12). Additionally, the audio-visual environment expected for the option ID 'A3' (in the shop and business user) is an environment with brighter light such as in an office, so that the luminance is set to maximum value and the luminance modulation characteristics is fixed. Moreover, as to the image quality setting, since the ambient brightness is high, the edge enhancement and the saturation enhancement are set to totally higher (FIG. 12). In addition, in the option ID 'A4' (bedroom), the luminance, the luminance modulation, and the image quality setting are set to the same as those in the option 'A1'. Note that the brightness sensor is set to 'ON', the brightness in the bedroom is measured by the brightness sensor, thereby adjusting the image quality setting.

<Processes on Hardware>

The processes on hardware of the image display apparatus of the third embodiment are the same as those of FIG. 7. Moreover, the information of FIG. 12 is stored in the storage as the 'group of image quality control rules', and the display size is acquired as the result information.

<Processing Flow of Third Embodiment>

FIG. 16 is a flowchart of processes in the image display apparatus of the third embodiment.

At the outset, it is determined whether the power is on (S0801). If the power is not on, step S0801 is repeated. If it is determined the power is on, the inquiry on the basis of the information for forming inquiry is outputted (S0802). Subsequently, the result information as the option for the answer to the inquiry is acquired (S0803). Subsequently, the display size is acquired as the result information (S1601). Subsequently, the image quality control rule is acquired according to the result information (S0804). Subsequently, the image quality control is executed according to the acquired image quality control rule (S0805).

<Brief Description of Effects of Third Embodiment>

In the image display apparatus of the third embodiment, the image quality control is carried out on the basis of the display size of the image display apparatus, thereby carrying out the proper image quality control.

<<Fourth Embodiment>>

<Concept of Fourth Embodiment>

The fourth embodiment of the present invention is the image display apparatus, in which the image quality control rule can be changed.

<Configuration of Fourth Embodiment>

FIG. 17 is a functional block diagram of the image display apparatus of the fourth embodiment. An image display apparatus (1700) comprises a 'storage for inquiry' (0201), a 'storage for image quality control rules' (0202), a 'first acquirer' (0203), an 'acquirer for image quality control rule' (0204), an 'image quality controller' (0205), a 'power-on detector' (0206), a 'setting controller' (0207), and a 'changer for image quality control rule' (1701). Moreover, the image display apparatus (1700) may further comprise the second acquirer. The configurations other than the 'changer for image quality control rule' (1701) are the same as those above-described, so that descriptions are omitted.

The 'changer for image quality control rule' (1701) changes the image quality control rules used by the image quality controller. Therefore, the image quality control rules as shown in FIGS. 4 and 12 can be changed. For example, the screen for setting the image quality control rule is displayed on the display screen, and the user inputs the changes through the screen for setting the image quality control rule by using a keyboard or a mouse etc., thereby changing the image quality control rules stored in the storage according to the input signals. Concretely speaking, for example, when the information of FIG. 4 or 12 is stored in the storage such as a hard-disk as the database, the SQL query to be executed for the database is generated and executed according to the input signals by the user's operation through the screen for setting the image quality control rule, thereby changing the image quality control rule. Moreover, the changer for image quality control rule may include a program for executing such processing.

<Processes on Hardware>

The processes on hardware of the image display apparatus of the fourth embodiment are the same as those of FIG. 7. Moreover, the program etc. for changing the 'group of image quality control rules' stored in the storage is executed.

<Processing Flow of Fourth Embodiment>

The processes in the image display apparatus of the fourth embodiment are the same as those of the above-mentioned embodiment, and moreover, the processing of changing the 'image quality control rules' is further executed.

<Brief Description of Effects of Fourth Embodiment>

In the image display apparatus of the fourth embodiment, the image quality control rules can be changed, so that when a predetermined image quality control rule needs to be changed depending on the actual audio-visual environment or on the user's taste, the image quality control rules are changed.

<<Fifth Embodiment>>

<Concept of Fifth Embodiment>

The fifth embodiment of the present invention is the image display apparatus, in which the image quality control can be changed.

<Configuration of Fifth Embodiment>

FIG. 18 is a functional block diagram of the image display apparatus of the fourth embodiment. An image display apparatus (1800) comprises a 'storage for inquiry' (0201), a 'storage for image quality control rules' (0202), a 'first acquirer' (0203), an 'acquirer for image quality control rule' (0204), an 'image quality controller' (0205), a 'power-on detector' (0206), a 'setting controller' (0207), and a 'changer for image quality control' (1801). Additionally, the image display apparatus (1800) may further comprise the second acquirer. Additionally, the image display apparatus (1800) may further comprise 'changer for image quality control rule'. The configurations other than the 'changer for image quality control' (1801) are the same as those above-described, so that descriptions are omitted.

The 'changer for image quality control' (1801) changes the image quality control in priority to the image quality control by the image quality controller. The term 'in priority to the image quality control by the image quality controller' means that image quality control can further be carried out after the image quality control by the image quality controller. In the 'image quality controller' (0205), as described above, the image quality control is basically carried out in accordance with the image quality control rule. Moreover, by the changer for image quality control, it is possible to do fine adjustment of the image quality control, for example, according to the user's operation or to the detection result of the brightness sensor. Note that, a difference between the changer for image quality control and the changer for image quality control rule is that the changer for image quality control does not execute the change of the image quality control rule itself. For example, the screen for adjusting the image quality is displayed on the display screen, and the user inputs the changes through the screen for adjusting the image quality by using a keyboard or a mouse etc., thereby carrying out the image quality control according to the input signals. Alternatively, the image display apparatus is provided with the buttons etc. for adjusting the image quality to adjust the luminance, edge enhancement, and saturation enhancement, and the user operates the buttons for adjusting the image quality, thereby carrying out the image quality control.

Moreover, the changer for image quality control may include a program for executing such processing.

<Processes on Hardware>

The processes on hardware of the image display apparatus of the fifth embodiment are the same as those of FIG. 7. Moreover, the processing for image quality control is further executed in addition to the basic processing as described in FIG. 7.

<Processing Flow of Fifth Embodiment>

FIG. 19 is a flowchart of processes in the image display apparatus of the fifth embodiment. At the outset, it is determined whether the power is on (S0801). If the power is not on, step S0801 is repeated. If it is determined the power is on, the inquiry on the basis of the information for forming inquiry is outputted (S0802). Subsequently, the result information as the option for the answer to the inquiry is acquired (S0803). Subsequently, the image quality control rule is acquired according to the result information (S0804). Subsequently, the image quality control is executed according to the acquired image quality control rule (S0805). Subsequently, the image quality control is changed (S1901).

<Brief Description of Effects of Fifth Embodiment>

In the image display apparatus of the fifth embodiment, the image quality control can be adjusted in addition to the basic processing of the image quality control according to the image quality control rule, so that when a predetermined image quality control rules are necessarily to be adjusted depending on the actual audio-visual environment or on the user's taste, the image quality control are adjusted.

<<Sixth Embodiment>>

<Concept of Sixth Embodiment>

The sixth embodiment of the present invention is the image display apparatus displaying the result of acquiring the image quality control rule.

<Configuration of Sixth Embodiment>

FIG. 20 is a functional block diagram of the image display apparatus of the sixth embodiment. An image display apparatus (2000) comprises a 'storage for inquiry' (0201), a 'storage for image quality control rules' (0202), a 'first acquirer' (0203), an 'acquirer for image quality control rule' (0204), an 'image quality controller' (0205), a 'power-on detector' (0206), a 'setting controller' (0207), and a 'display for result' (2001). Additionally, the image display apparatus (2000) may further comprise the second acquirer. Additionally, the image display apparatus (2000) may further comprise 'changer for image quality control rule'. Additionally, the image display apparatus (2000) may further comprise 'changer for image quality control'. The configurations other than the 'display for result' (2001) are the same as those above-described, so that descriptions are omitted.

The 'display for result' (2001) has a function of displaying the result acquired by the acquirer for image quality control rule. The term 'displaying the result acquired by the acquirer for image quality control rule' means that the details of the image quality control rule are mainly displayed. For example, when acquiring the image quality control rule for the option ID 'A1' in FIG. 4, the indication as 'image quality control is carried out at luminance: 283 cd/m$^2$, luminance modulation characteristics: 283 (cd/m$^2$) as criterion, image quality setting: middle level' is displayed on the display screen. Moreover, the display for result displays the result, and the user checks the details of the control, so that the image quality control may be executed only when the user holds the OK button down.

<Processes on Hardware>

The processes on hardware of the image display apparatus of the sixth embodiment are the same as those of FIG. 7. Moreover, the processing for generating the drawing data for displaying the acquired image quality control rule in Video RAM and of outputting it to the display is carried out in addition to the basic processing as described in FIG. 7.

<Processing Flow of Sixth Embodiment>

FIG. 9 is a flowchart of processes in the image display apparatus of the sixth embodiment.

At the outset, it is determined whether the power is on (S0801). If the power is not on, step S0801 is repeated. If it is determined the power is on, the inquiry on the basis of the information for forming inquiry is outputted (S0802). Subsequently, the result information as the option for the answer to the inquiry is acquired (S0803). Subsequently, the image quality control rule is acquired according to the result information (S0804). Subsequently, the image quality control is executed according to the acquired image quality control rule (S0805). Subsequently, the result of acquiring the image quality control rule is displayed (S0901). Note that, step S0901 may he executed in priority to step S0805.

<Brief Description of Effects of Sixth Embodiment>

In the image display apparatus of the sixth embodiment, the acquired image quality control rule is displayed, so that the user can clearly figure out the executed image quality control.

<<Seventh Embodiment>>

<Concept of Seventh Embodiment>

The seventh embodiment of the present invention is the image display apparatus having two selectable image quality modes to select high or low level of luminance in one audio-visual environment mode.

<Configuration of Seventh Embodiment>

FIG. 24 is a functional block diagram of the image display apparatus of the seventh embodiment. An image display apparatus (2400) comprises a 'storage for inquiry' (0201), a 'storage for image quality control rules' (0202), a 'first acquirer' (0203), an 'acquirer for image quality control rule' (0204), an 'image quality controller' (0205), a 'power-on detector' (0206), a 'setting controller' (0207), and a 'switching interface' (2401). The 'acquirer for image quality control rule' (0204) comprises 'means for displaying an icon' (2402). Additionally, the image display apparatus (2400) may further comprise the second acquirer. Additionally, the image display apparatus (2000) may further comprise 'changer for image quality control rule'. Additionally, the image display apparatus (2000) may further comprise 'changer for image quality control'. Additionally, the image display apparatus (2000) may further comprise the 'display for result'. The configurations other than the 'switching interface' (2401) and the 'means for displaying an icon' (2402) are the same as those above-described, so that descriptions are omitted.

The 'switching interface' (2401) has a function of switching between a first image quality mode and a second image quality mode. Here, the first image quality mode is for displaying an image with relatively high-luminance, and the second image quality mode is for displaying an image with relatively low-luminance. The first and second image quality modes are selectable for a first audio-visual environment with relatively high level of illumination and for a second audio-visual environment with relatively low level of illumination, respectively. Note that, in the first audio-visual environment mode, the image quality control rule for the audio-visual environment with relatively high level of illumination such as the audio-visual environment in the shop is selectable, and in the second audio-visual environment mode, the image quality control rule for the audio-visual environment with relatively low level of illumination such as the audio-visual environment in the home is selectable. Accordingly, after selecting one audio-visual environment on the basis of difference in brightness level, it is possible to select high or low level of luminance, thereby carrying out advanced image quality control in a simple manner.

Note that, it is preferable that the luminance in the first image quality mode and that in the second image quality mode in each of the first audio-visual environment mode and the second audio-visual environment mode are set to be different. The reason for this is that the suitable luminance differs depending on the audio-visual environment, and the luminance variable width also differs. For example, in the case of installing the apparatus in the shop, illumination in the sales floor for image display apparatus is high and large-sized apparatus is placed therein In addition, it is necessary to show the difference between the first and second image quality modes to a customer in an easy-understandable manner, and to persuade the customer that a high-precision image quality control is possible. Meanwhile, in the case of installing the apparatus in the home, in comparison with the case of the shop, illumination is low and small-sized display is placed therein In addition, it is necessary to control the image quality, thereby providing comfortable longtime-viewing without visual fatigue. Thus, although the image quality control in the shop and that in the home are actually different, it is necessary to make the user recognize them to be the same. For example, in FIG. 25, in the first audio-visual environment, the luminance in the first image quality mode and that in the second image quality mode are '450 $cd/m^2$' and '350 $cd/m^2$', respectively. In the second audio-visual environment, the luminance in the first image quality mode and that in the second image quality mode are '300 $cd/m^2$' and '240 $cd/m^2$', respectively. Therefore, by using the same icon, the user recognizes that the same function of image quality control works even if luminance and luminance difference are not the same as those in the shop.

The 'means for displaying an icon' (2402) has a function of displaying an icon, such that an icon for the first image quality mode in the first audio-visual environment mode and that in the second audio-visual environment mode are same, and such that an icon for the second image quality mode in the first audio-visual environment mode and that in the second audio-visual environment mode are same. The purpose of this function is that, in the home, the user can experience the luminance difference in the shop between the first image quality mode and the second image quality mode. As described above, it is preferable that the image quality settings for first image quality mode and the second image quality mode in the first audio-visual environment mode are set to be different from the image quality settings for first image quality mode and the second image quality mode in the second audio-visual environment mode. The reasons for this are that the brightness in the shop is higher than that in the home, it is necessary to show the luminance difference clearly, and the display size in the shop is large. However, in the home, the user wishes to do the same image quality control as that in the shop. This is consumer mind Therefore, in the image display apparatus of the seventh embodiment, the luminance of the first image quality mode and the second image quality mode in the second audio-visual environment mode are set to be suitable for the audio-visual environment with relatively low illumination, and icons are shared in the first and second audio-visual environments, so that when switching the image quality modes in the first audio-visual environment mode, the user can experience the switching of the image quality modes in the second audio-visual environment mode. Therefore, the same icon is used, so that the user need not be conscious of the difference between the first and second audio-visual environment modes, and the corrections for suitable luminance in the respective audio-visual environment modes are carried out. Note that, the term 'same' means similar and recognizable at a glance, and includes what is termed 'a scope of similarity' in trademark and design patent.

<Processes on Hardware>

The processes on hardware of the image display apparatus of the seventh embodiment are the same as those of FIG. 7. Moreover, the processing for switching between two different image quality modes with different luminance settings is carried out in addition to the basic processing as described in FIG. 7.

<Processing Flow of Seventh Embodiment>

FIG. 26 is a flowchart of processes in the image display apparatus of the seventh embodiment.

At the outset, it is determined whether the power is on (S0801). If the power is not on, step S0801 is repeated. If it is determined the power is on, the inquiry on the basis of the information for forming inquiry is outputted (S0802). Here, selection of the audio-visual environment mode is executed (S2601), and selection of the image quality mode is executed (S2602). Subsequently, the result information as the option for the answer to the inquiry is acquired (S0803). Subsequently, the image quality control rule is acquired according to the result information (S0804). Subsequently, the image quality control is executed according to the acquired image quality control rule (S0805).

<Brief Description of Effects of Seventh Embodiment>

In the image display apparatus of the seventh embodiment, the icons for the same image quality modes in the different audio-visual environment modes are same, so that in the

BRIEF DESCRIPTION OF THE DRAWINGS

FIG. 3 is a diagram exemplifying information for forming inquiry and option information, which are stored in the storage for inquiry.

FIG. 4 is a diagram exemplifying image quality control rules stored in a storage for image quality control rules.

FIG. 5 is a diagram exemplifying graphs of luminance modulation characteristics

FIG. 12 is a diagram exemplifying image quality control rules on the basis of display size.

FIG. 14 is a diagram exemplifying graphs of luminance modulation characteristics in each display size.

FIG. 15 is a diagram showing a relation between the display size and setting of image quality.

FIG. 21 is a diagram exemplifying information for forming inquiry and option information, which are stored in the storage for inquiry.

FIG. 25 is a diagram exemplifying icons for an image quality mode of the seventh embodiment.

DESCRIPTION OF REFERENCE NUMERALS

Figure 1:
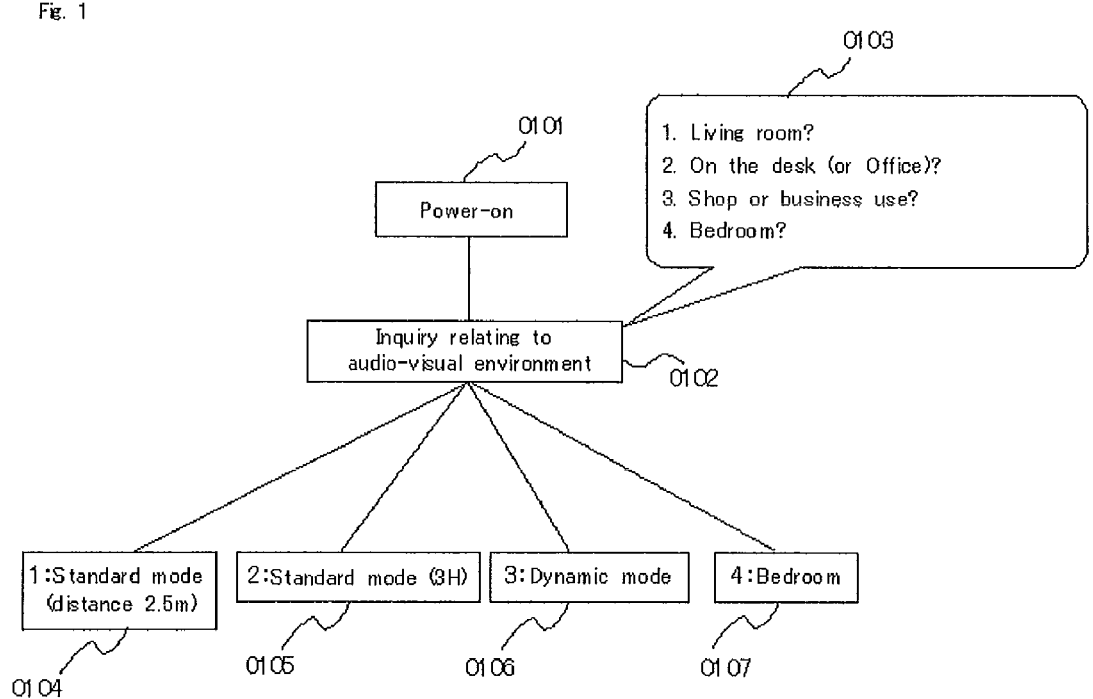
FIG. 1 is a conceptual diagram showing operations of an image display apparatus of the present invention.
Figure 2:
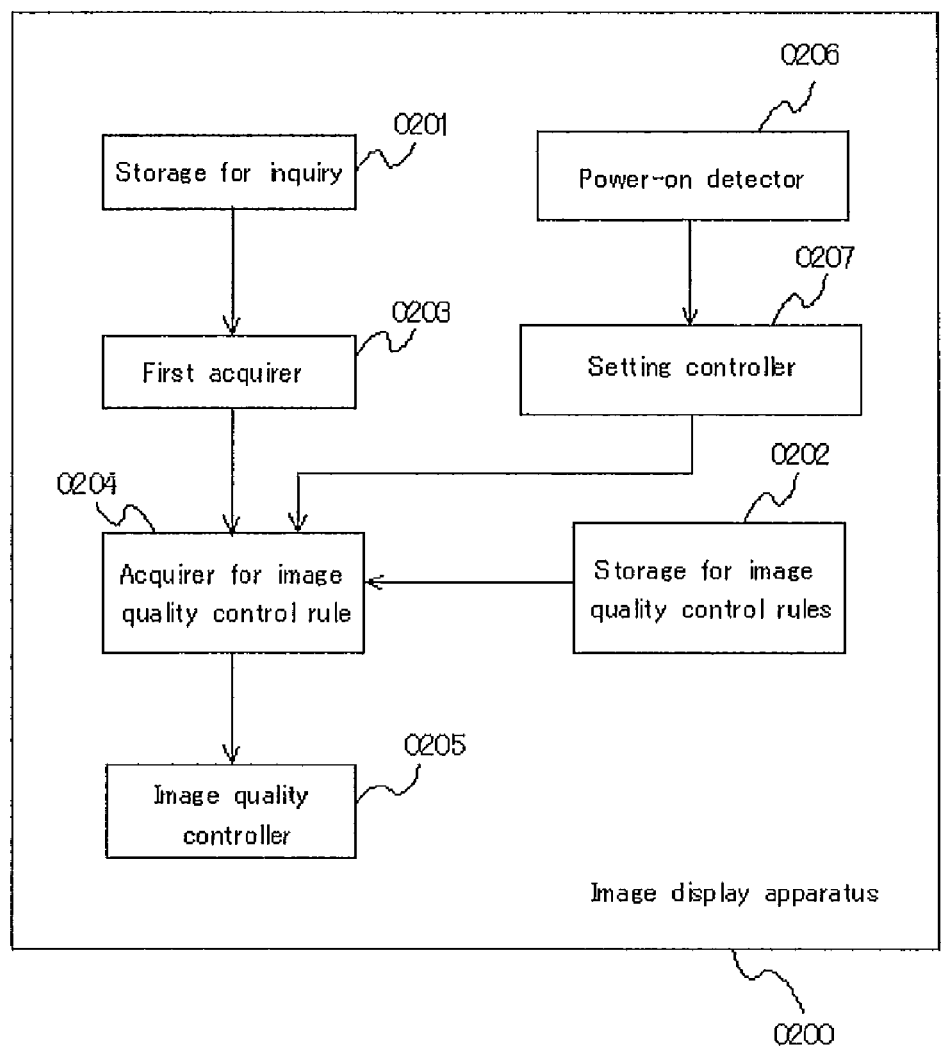
FIG. 2 is a functional block diagram of the image display apparatus of a first embodiment.
Figure 6:
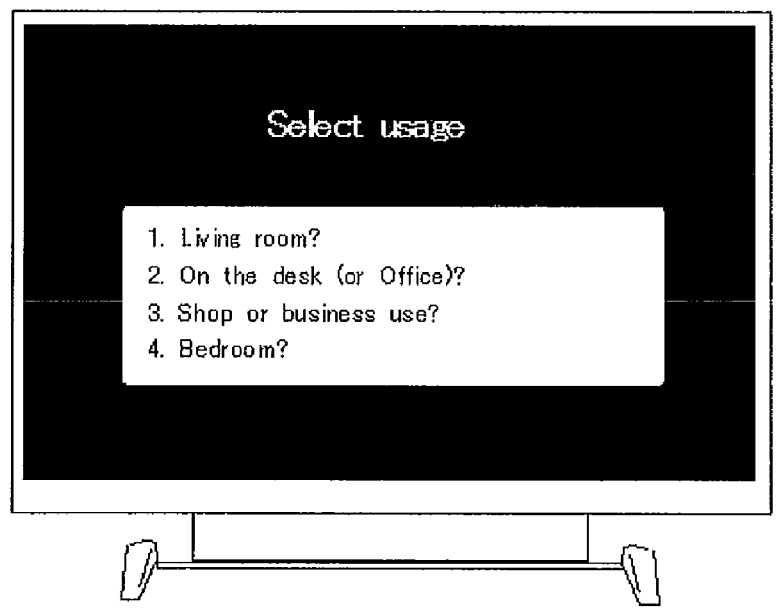
FIG. 6 is a diagram exemplifying inquiries.
Figure 7:
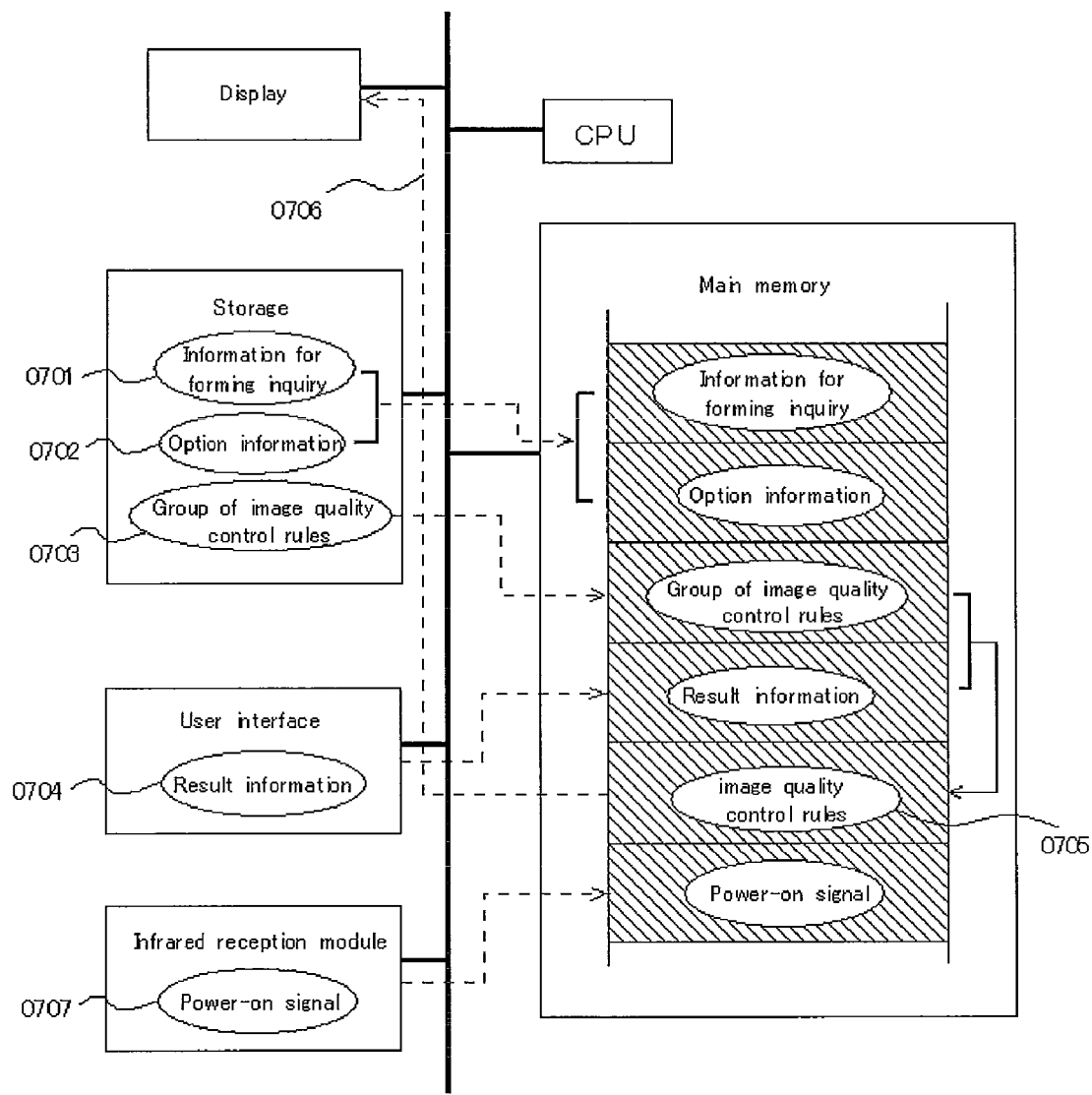
FIG. 7 is a diagram exemplifying processes on hardware of the image display apparatus.
Figure 8:
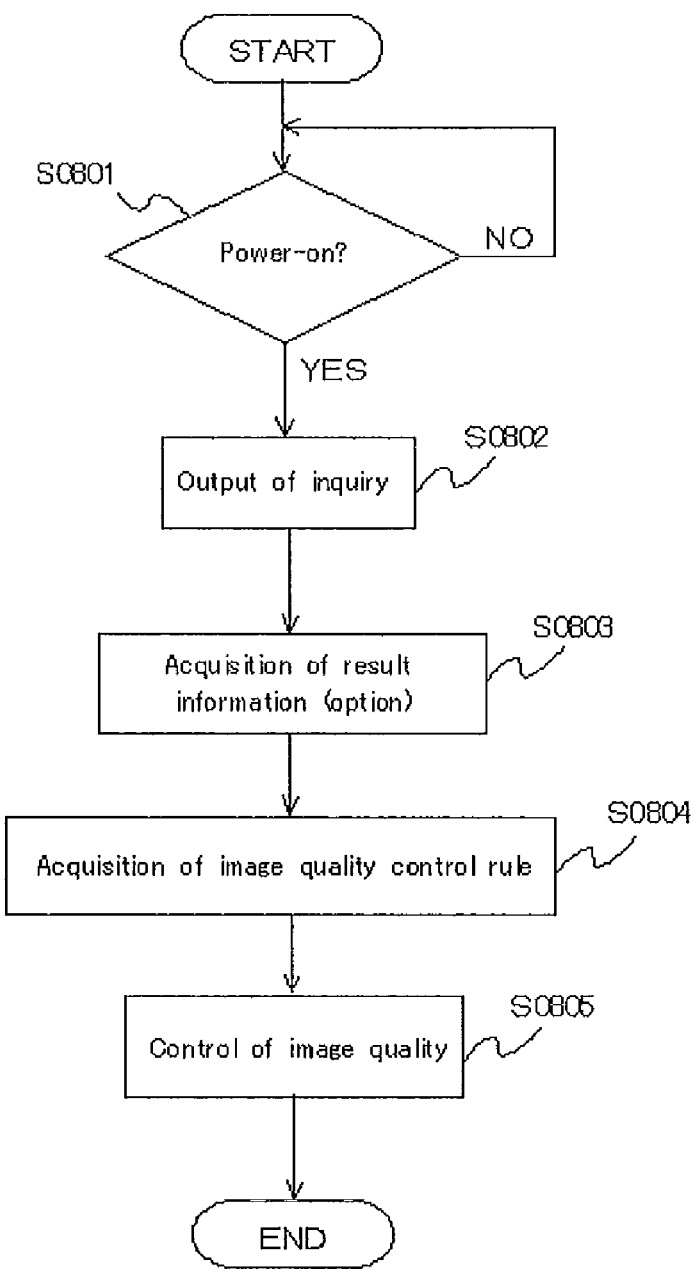
FIG. 8 is a flowchart of processes in the image display apparatus of the first embodiment.
Figure 9:
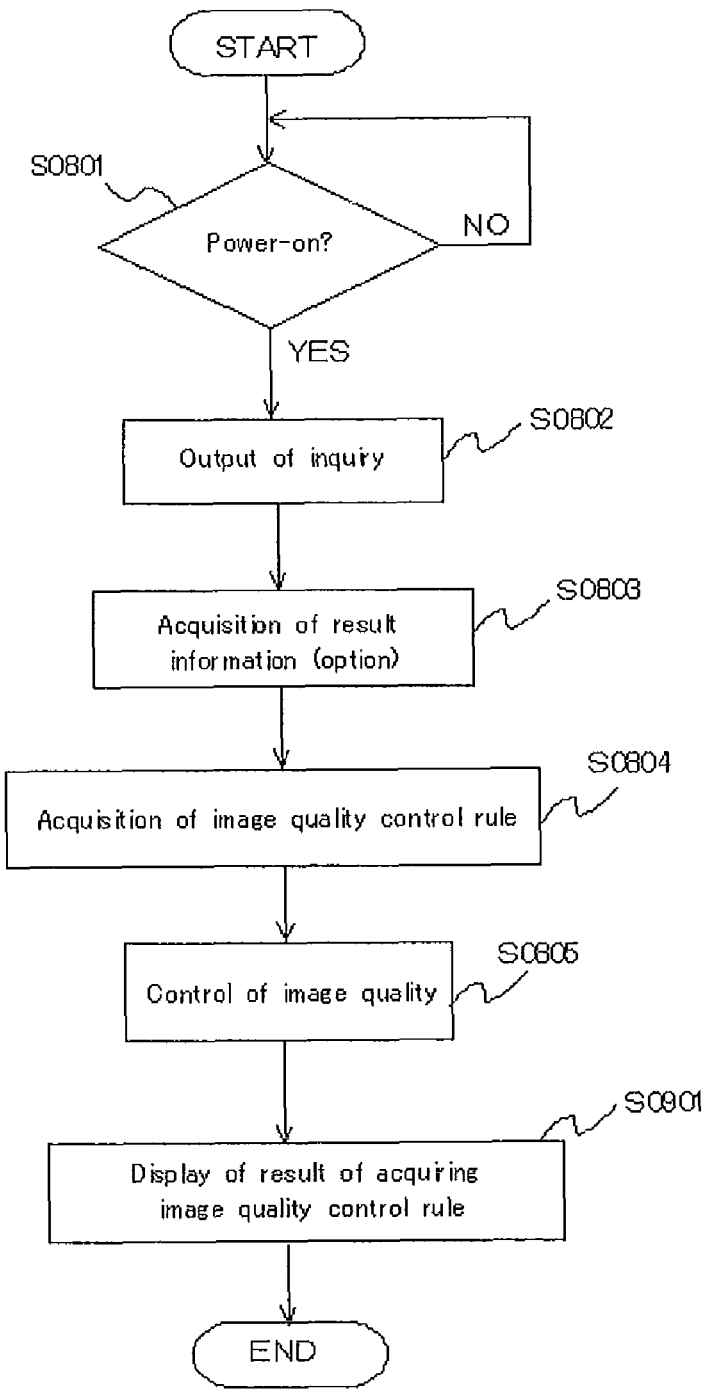
FIG. 9 is a flowchart of processes in the image display apparatus of a sixth embodiment.
Figure 10:
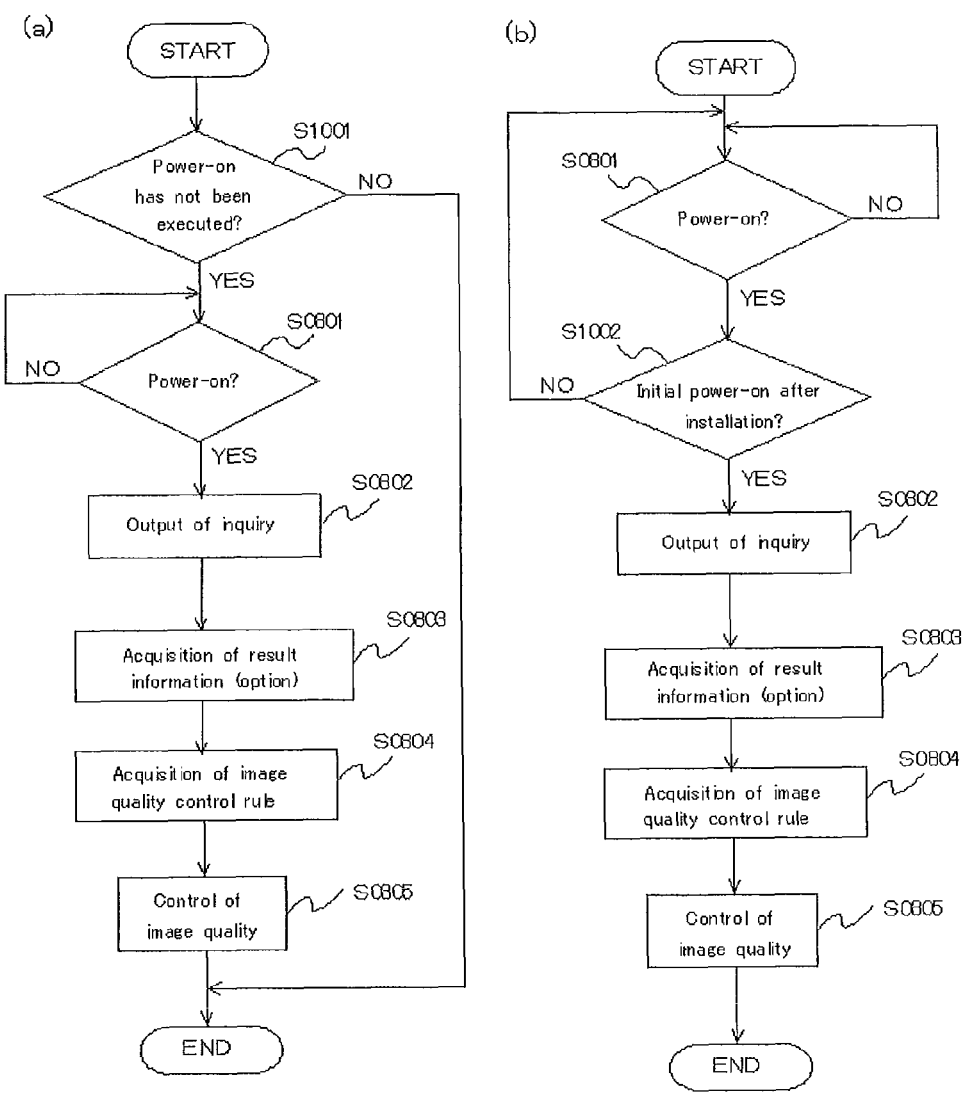
FIG. 10 is a flowchart of processes in the image display apparatus of a second embodiment.
Figure 11:
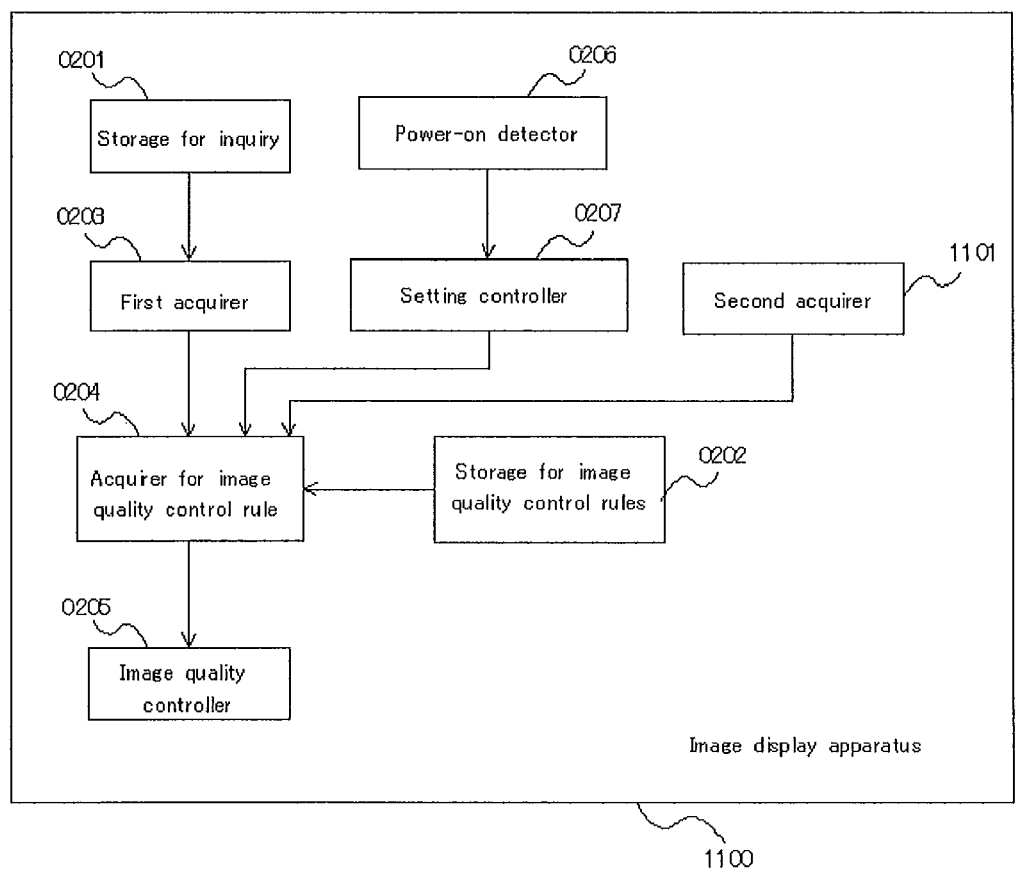
FIG. 11 is a functional block diagram of the image display apparatus of a third embodiment.
Figure 13:
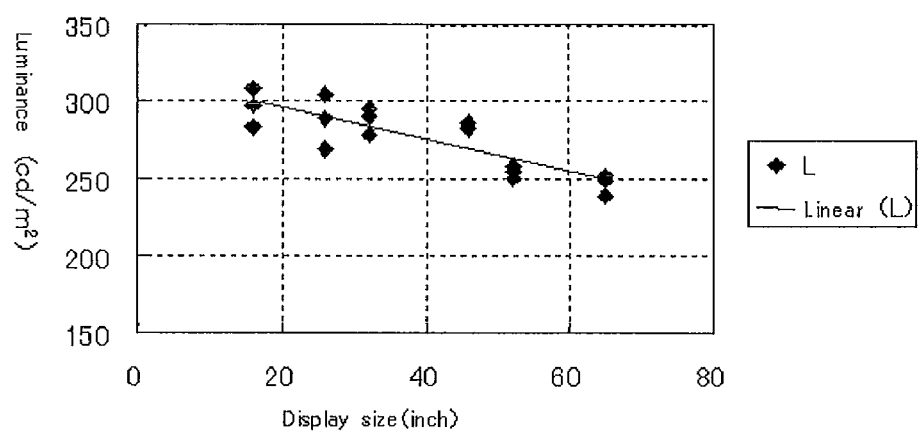
FIG. 13 is a diagram exemplifying experimental result relating the display size and luminance.
Figure 16:
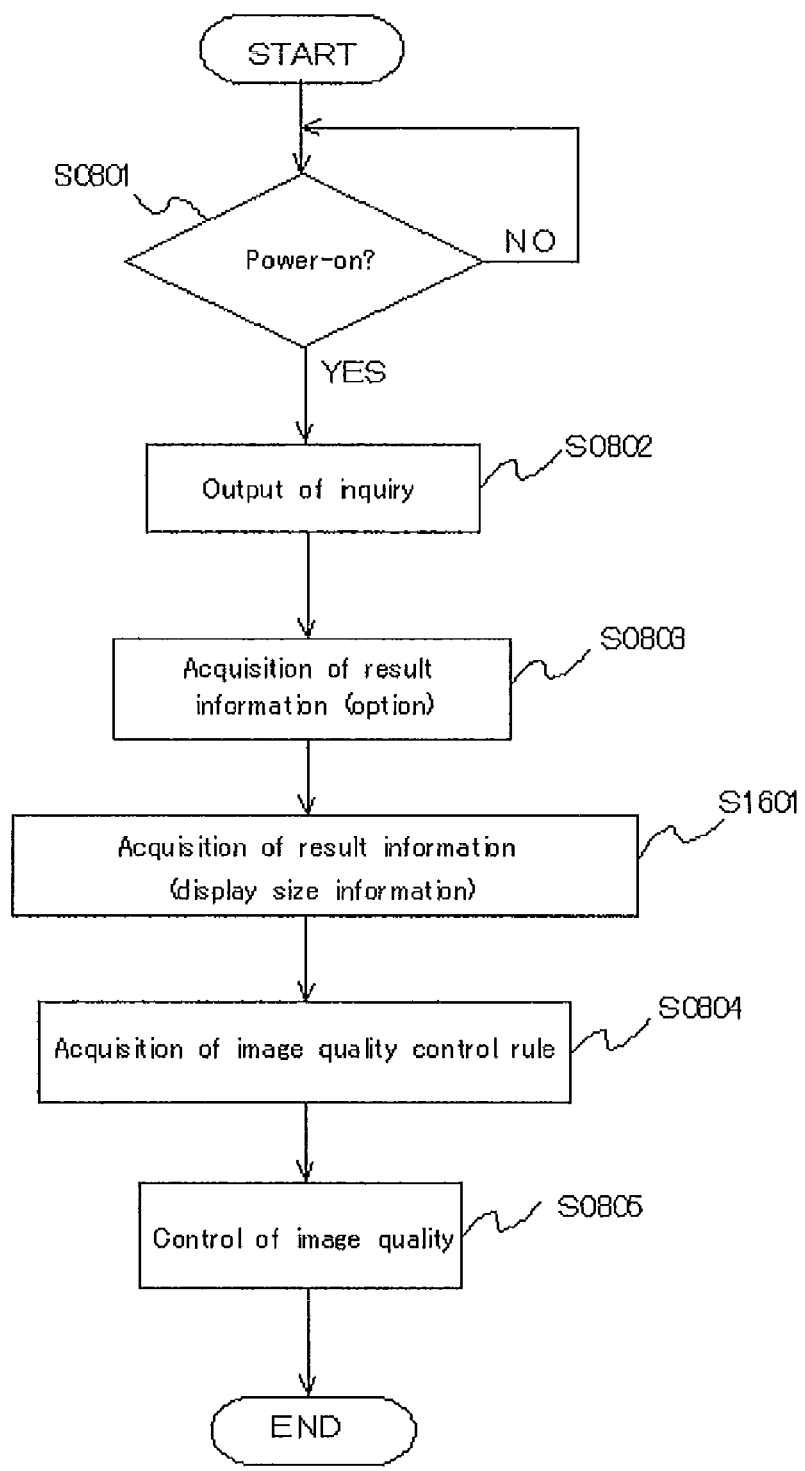
FIG. 16 is a flowchart of processes in the image display apparatus of a third embodiment.
Figure 17:
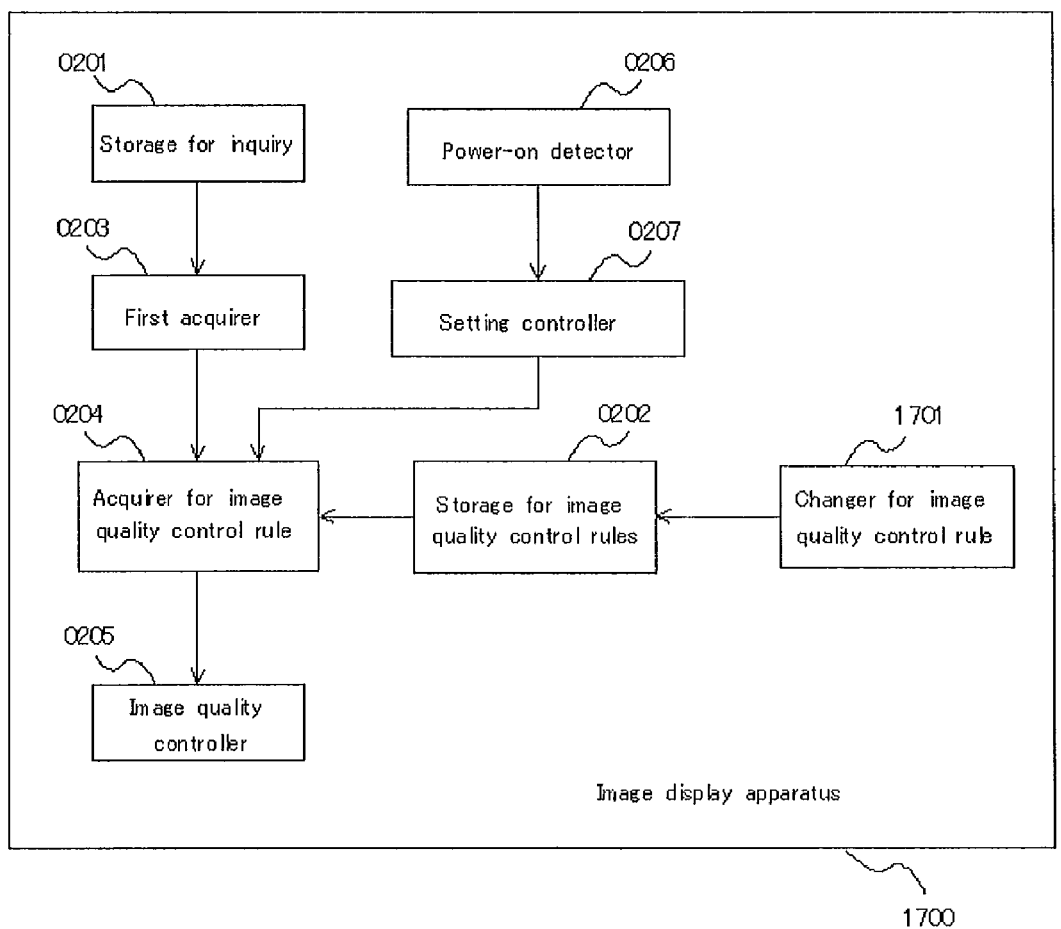
FIG. 17 is a functional block diagram of the image display apparatus of a fourth embodiment.
Figure 18:
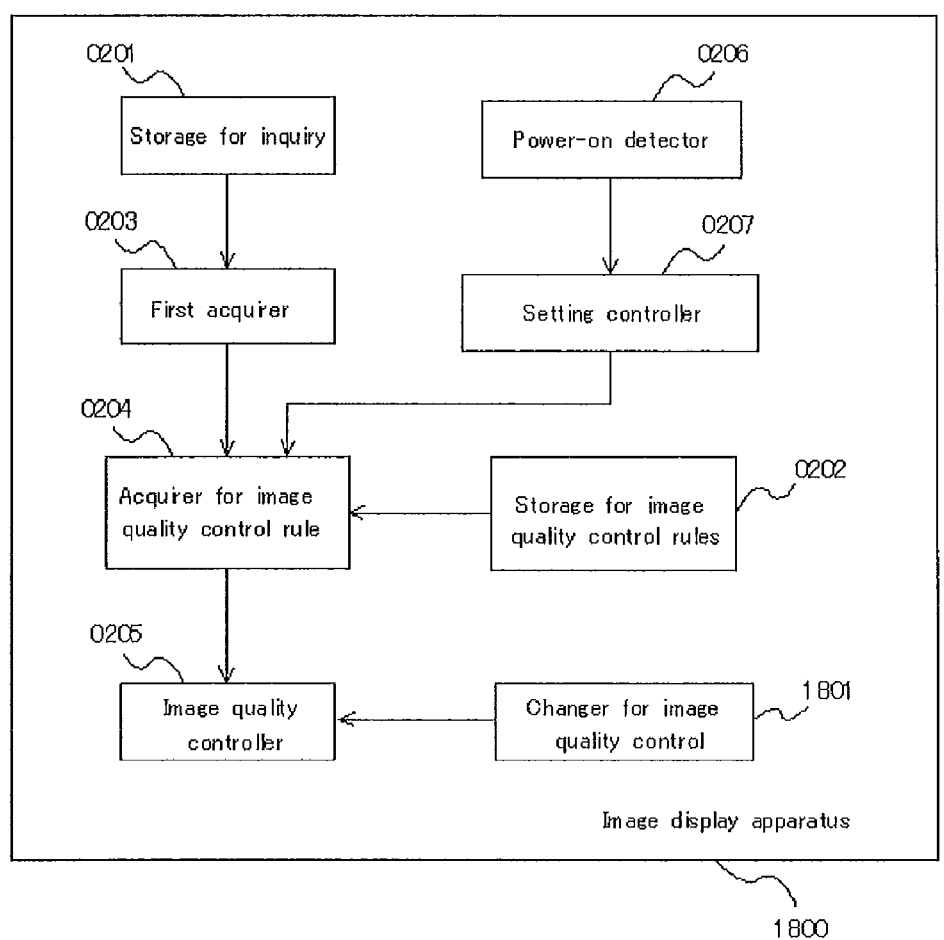
FIG. 18 is a functional block diagram of the image display apparatus of a fifth embodiment.
Figure 19:
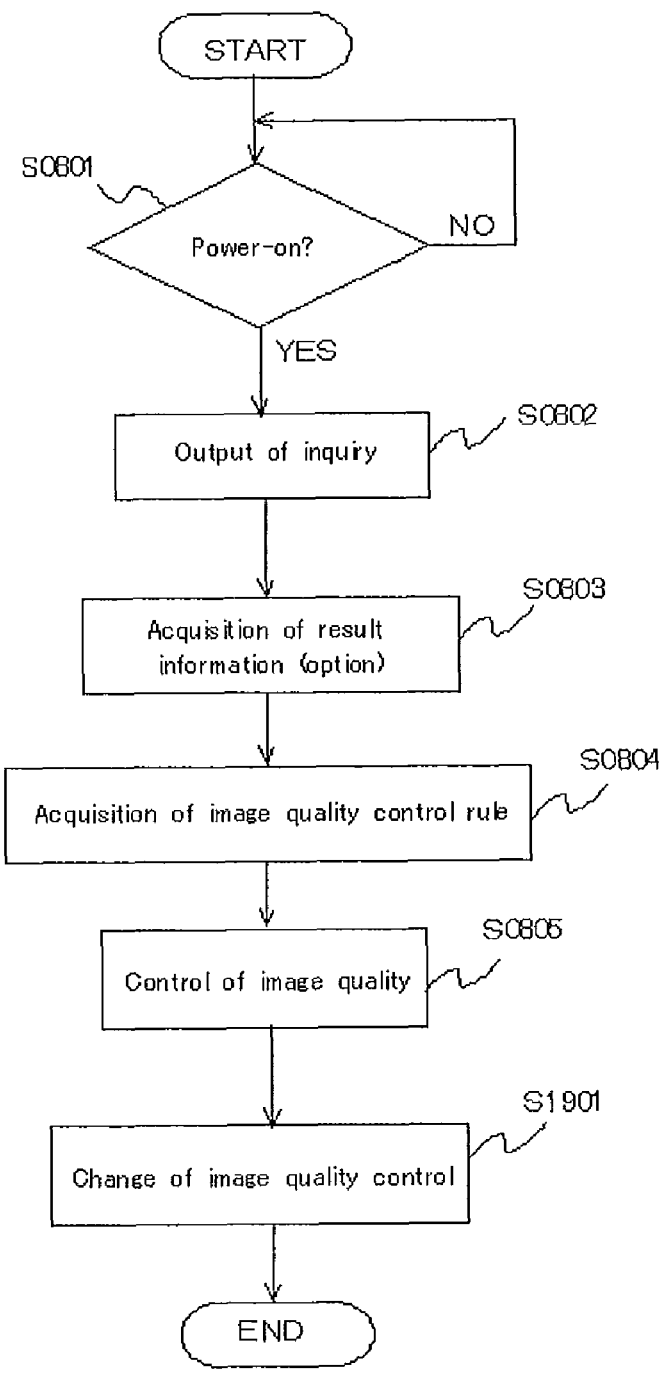
FIG. 19 is a flowchart of processes in the image display apparatus of the fifth embodiment.
Figure 20:
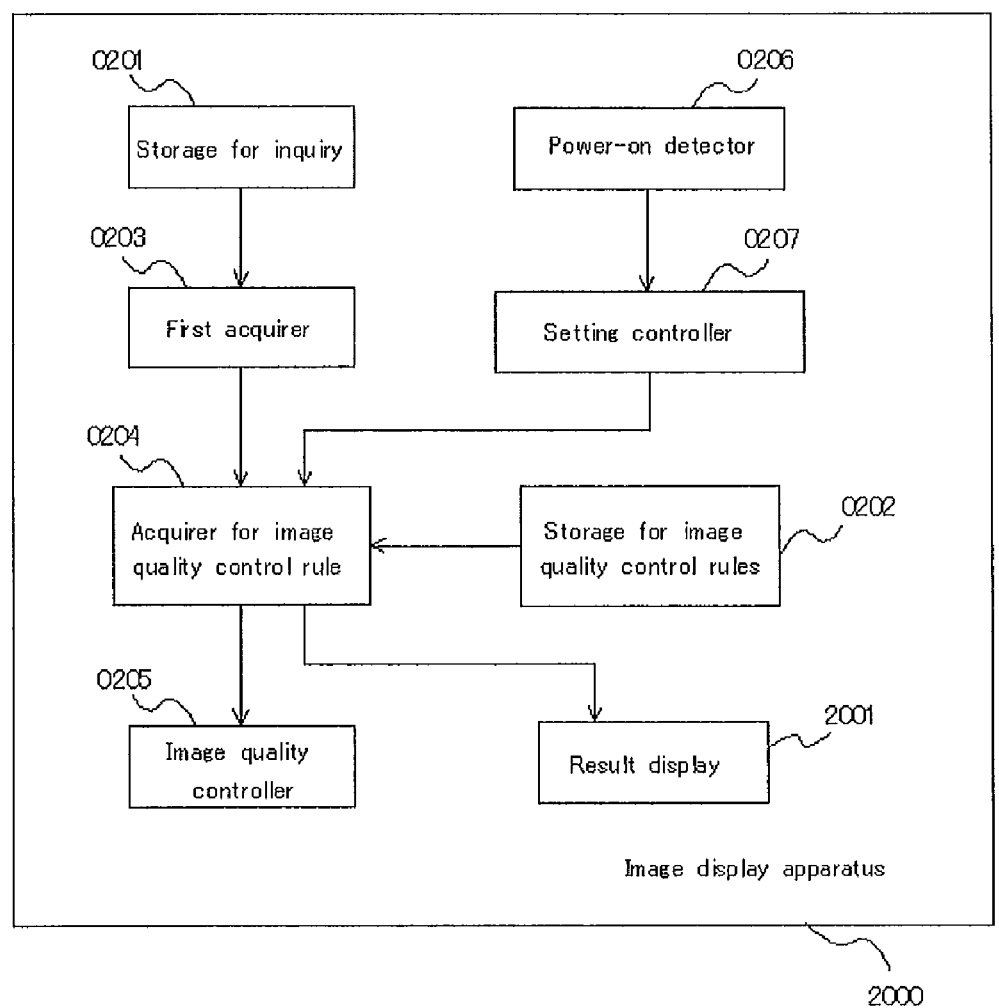
FIG. 20 is a functional block diagram of the image display apparatus of a sixth embodiment.
Figure 22:
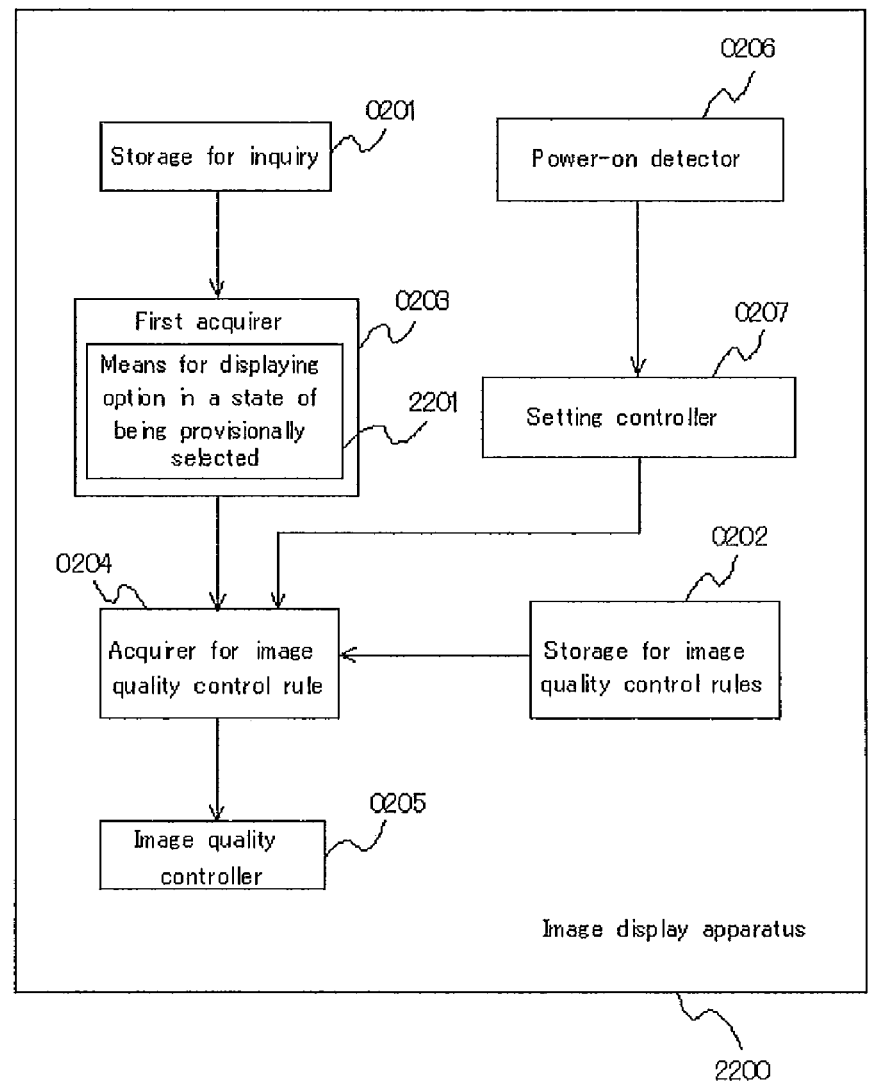
FIG. 22 is a functional block diagram of the image display apparatus of the first embodiment.
Figure 23:
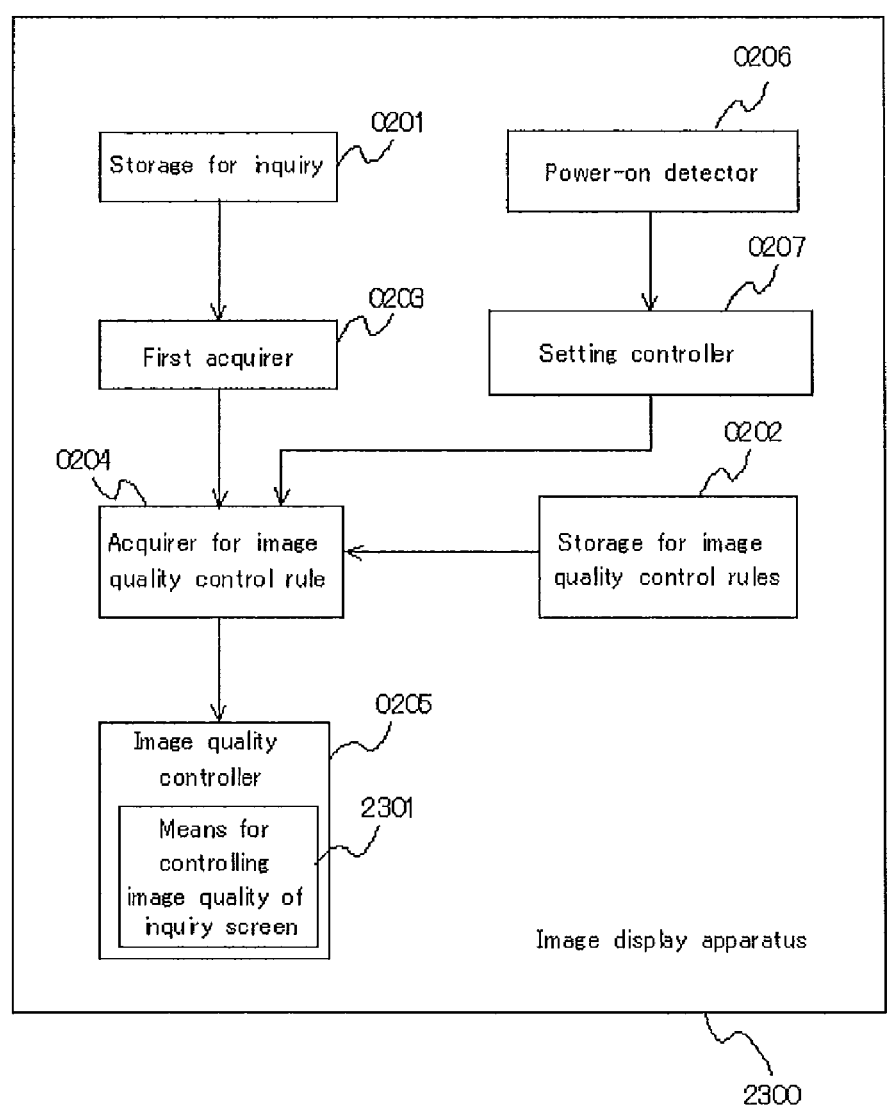
FIG. 23 is a functional block diagram of the image display apparatus of the first embodiment.
Figure 24:
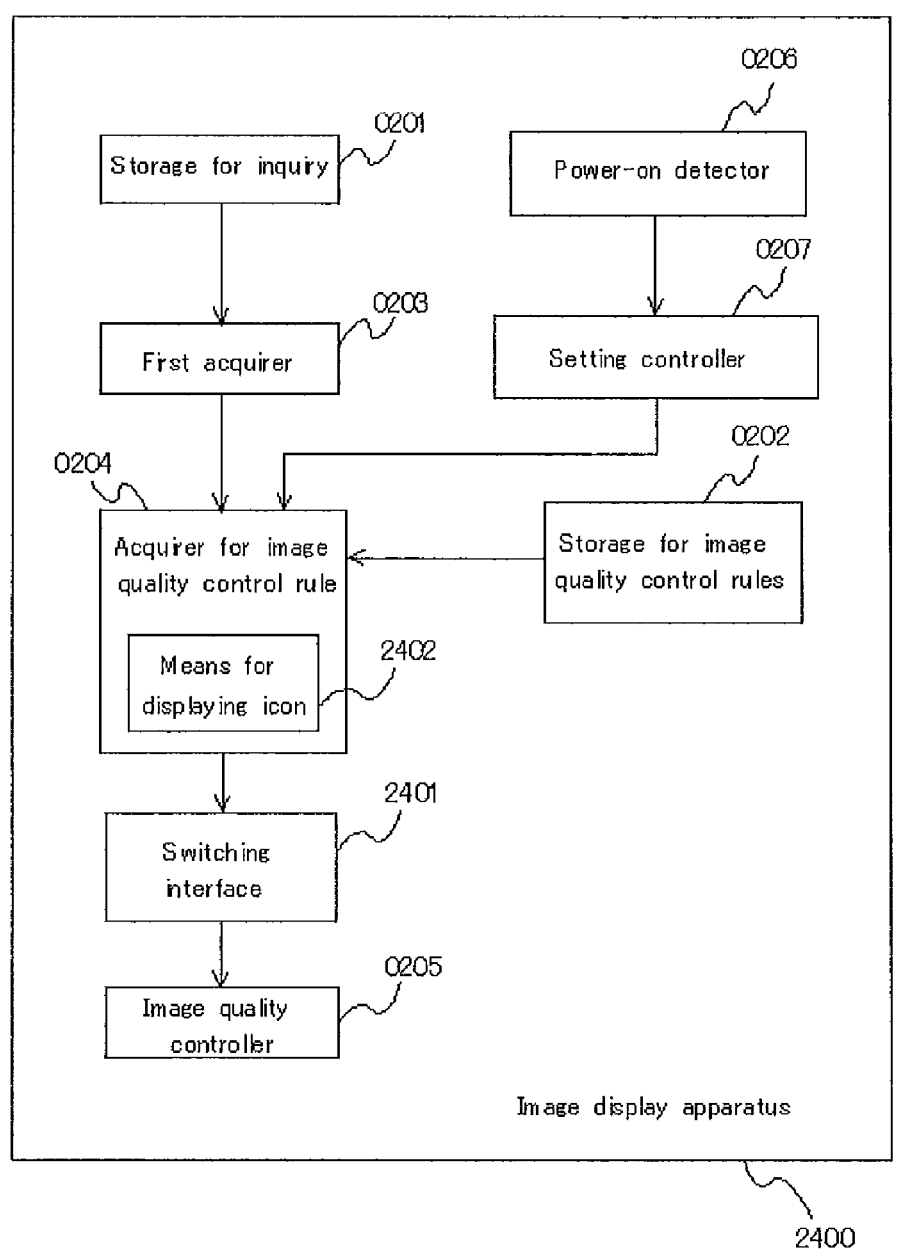
FIG. 24 is a functional block diagram of the image display apparatus of a seventh embodiment.
Figure 26:
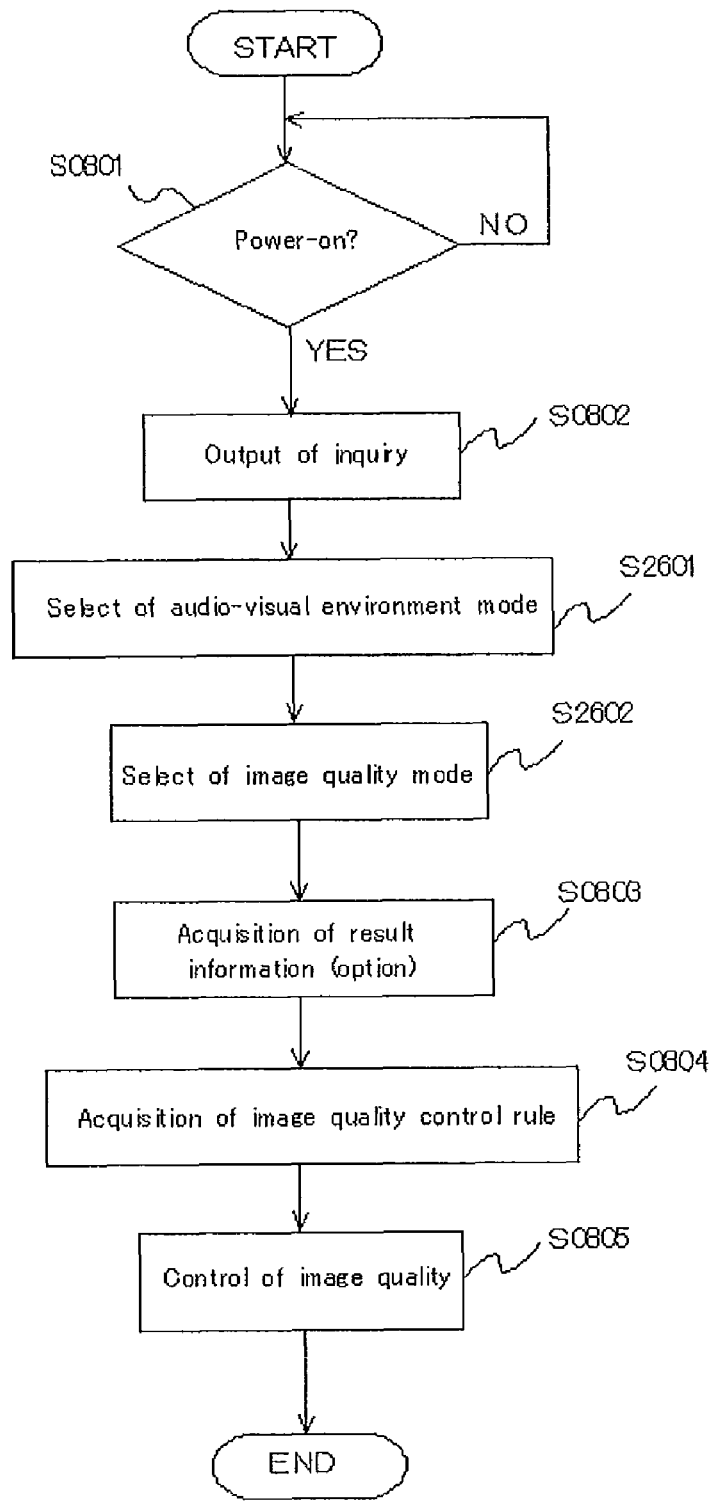
FIG. 26 is a flowchart of processes in the image display apparatus of the seventh embodiment.

0101 Power-on
0102 Output of inquiries relating to audio-visual environment
0103 Inquiries relating to audio-visual environment
0104 Option
0105 Option
0106 Option
0107 Option
0201 Storage for inquiry
0202 Storage for image quality control rules
0203 First acquirer
0204 Acquirer for image quality control rule
0205 Image quality controller
0206 Power-on detector
0207 Setting controller

What is claimed is:

1. An image display apparatus, comprising:
a storage for inquiry, storing information for forming inquiry relating to an audio-visual environment and option information selected as an answer in response to the inquiry formed on the basis of the information for forming inquiry;
a storage for image quality control rules, storing a plurality of image quality control rules suitable for the audio-visual environment expected according to the option information as the answer;
a first acquirer, outputting the inquiry relating to the audio-visual environment and option information on the basis of the information for forming inquiry stored in the storage for inquiry, and acquiring result information from a user, by selecting an option from the option information as the answer indicating the audio-visual environment from the user's perspective and is to be utilized for acquiring the image quality control rule;
an acquirer for image quality control rule, acquiring the image quality control rule from the storage for image quality control rules according to the result information;
an image quality controller, controlling the image quality according to the acquired image quality control rule;
a power-on detector, detecting power-on; and
a setting controller, operating the acquirer for image quality control rule according to said detection.

2. The image display apparatus according to claim 1, wherein said power-on detector is operated only when a power-on is done upon installation of the apparatus.

3. The image display apparatus according to claim 2, further comprising:
a second acquirer, acquiring display size information as the result information.

4. The image display apparatus according to claim 1, further comprising:
a second acquirer, acquiring display size information as the result information.

5. The image display apparatus according to claim 1, further comprising:
a changer for image quality control rule, changing the image quality control rule used by the image quality controller.

6. The image display apparatus according to claim 1, further comprising:
a changer for image quality control, changing the image quality control in priority to the image quality control by the image quality controller.

7. The image display apparatus according to claim 1, wherein said image quality control includes any one or more than one of luminance control, luminance modulation characteristics control, color density control, or sharpness control.

8. The image display apparatus according to claim 1, further comprising:
a display for result, displaying the result acquired by the acquirer for image quality control rule.

9. The image display apparatus according to claim 1,
wherein the information for forming inquiry stored by the storage for inquiry is at least two pieces of information, information for inquiry to acquire the image quality control rule suitable for the audio-visual environment with relatively high level of illumination such as the audio-visual environment in a shop, and the image quality control rule suitable for the audio-visual environment with relatively low level of illumination such as the audio-visual environment in a home.

10. The image display apparatus according to claim 1, further comprising:
a switching interface, carrying out switching between a first image quality mode and a second image quality mode, in which the audio-visual environment with relatively high level of illumination such as the audio-visual environment in the shop as a first audio-visual environment rule includes a first image quality mode for displaying an image with relatively high-luminance, and a second image quality mode for displaying an image with relatively low-luminance, and the audio-visual environment with relatively low level of illumination such as the audio-visual environment in the home as a second audio-visual environment rule includes a first image quality mode for displaying an image with relatively high-luminance, and a second image quality mode for displaying an image with relatively low-luminance,
wherein the acquirer for image quality control rule comprises
means for displaying an icon, such that an icon for the first image quality mode in the first audio-visual environment mode and that in the second audio-visual environment mode are the same, and such that an icon for the second image quality mode in the first audio-visual environment mode and that in the second audio-visual environment mode are the same.

11. The image display apparatus according to claim 1,
wherein the first acquirer comprises
means for displaying an option in a state of provisional selection, such that the option for selecting the image quality control rule for relatively low-luminance is provisionally selected in an initial state in a screen for selecting the option to acquire the image quality control rule for relatively high-luminance or the option to acquire the image quality control rule for relatively low-luminance.

12. The image display apparatus according to claim 1,
wherein the image quality controller comprises
means for controlling image quality of an inquiry screen utilizing the image quality control rule for relatively low-luminance among the image quality control rules stored in the storage for image quality control rules upon outputting the inquiry from the first acquirer.

13. A method for operating an image display apparatus, which comprises a storage for inquiry, storing information for forming inquiry relating to an audio-visual environment and option information selected as an answer in response to the inquiry formed on the basis of the information for forming inquiry, and a storage for image quality control rules, storing a plurality of image quality control rules suitable for the audio-visual environment expected according to the option information as the answer, the method comprising the steps of:
detecting a power-on;
first acquisition for outputting the inquiry relating to the audio-visual environment and option information on the basis of the information for forming inquiry stored in the storage for inquiry, and for acquiring result information from a user, by selecting an option from the option information as the answer indicating the audio-visual environment from the user's perspective and is to be utilized for acquiring the image quality control rule;
acquiring the image quality control rule from the storage for image quality control rules according to the result information; and
controlling the image quality according to the acquired image quality control rule.

14. The method for operating an image display apparatus according to claim 13,
wherein said step of detecting a power-on is executed only when a power-on is done upon installation of the apparatus.

* * * * *